(12) United States Patent
Wakabayashi et al.

(10) Patent No.: US 10,291,364 B2
(45) Date of Patent: May 14, 2019

(54) COMMUNICATIONS DEVICES AND METHODS

(71) Applicant: SONY CORPORATION, Tokyo (JP)

(72) Inventors: Hideji Wakabayashi, Basingstoke (GB); Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 78 days.

(21) Appl. No.: 15/518,418

(22) PCT Filed: Nov. 3, 2015

(86) PCT No.: PCT/EP2015/075557
§ 371 (c)(1),
(2) Date: Apr. 11, 2017

(87) PCT Pub. No.: WO2016/078905
PCT Pub. Date: May 26, 2016

(65) Prior Publication Data
US 2017/0310427 A1    Oct. 26, 2017

(30) Foreign Application Priority Data
Nov. 18, 2014 (EP) .................................. 14193764.9

(51) Int. Cl.
*H04L 1/18* (2006.01)
*H04W 72/04* (2009.01)
(Continued)

(52) U.S. Cl.
CPC .......... *H04L 1/1825* (2013.01); *H04L 1/1854* (2013.01); *H04L 1/1887* (2013.01);
(Continued)

(58) Field of Classification Search
None
See application file for complete search history.

(56) References Cited

U.S. PATENT DOCUMENTS 7,577,399 B2 * 8/2009 Eichinger .......... H04B 7/15528
455/11.1
7,830,907 B1 * 11/2010 Petranovich ...... H04W 72/1215
370/432
(Continued)

OTHER PUBLICATIONS

Office Action dated Mar. 6, 2018 in European Patent Application No. 15 788 068.3.
(Continued)

*Primary Examiner* — Eunsook Choi
(74) *Attorney, Agent, or Firm* — Xsensus LLP

(57) ABSTRACT

A communications device and method, in which data is communicated via a wireless access interface to a destination communications device with a device-to-device communication procedure. The communications device encodes the data, as data units, for transmission to the destination communications device with a repeat request-type protocol, the encoding providing an indication whether the data has been received correctly. The communications device transmits the encoded data units to the destination communications device, and receives an acknowledgement ACK message that one of the encoded data units has been correctly received by the destination communications device, or a negative acknowledgement NACK message that the encoded data units were not received correctly by the destination communications device. The ACK or NACK message is transmitted by another communications devices of a group of communications devices, acting as a relay communications device, which received and retransmitted the ACK or NACK message from the destination communications device.

16 Claims, 14 Drawing Sheets

(51) Int. Cl.
*H04L 5/00* (2006.01)
*H04L 1/00* (2006.01)
*H04L 5/14* (2006.01)
*H04W 88/02* (2009.01)
*H04L 1/12* (2006.01)

(52) U.S. Cl.
CPC ............ *H04L 5/001* (2013.01); *H04L 5/0055* (2013.01); *H04W 72/0406* (2013.01); *H04L 5/14* (2013.01); *H04L 2001/0097* (2013.01); *H04L 2001/125* (2013.01); *H04W 88/02* (2013.01)

(56) References Cited

U.S. PATENT DOCUMENTS

| | | | |
|---|---|---|---|
| 8,537,037 B2* | 9/2013 | Majonen | H04L 1/1845 341/51 |
| 2009/0003378 A1* | 1/2009 | Sachs | H04L 1/16 370/466 |
| 2010/0281322 A1* | 11/2010 | Park | H04L 1/0001 714/748 |
| 2011/0261745 A1 | 10/2011 | Bontu et al. | |
| 2011/0286406 A1* | 11/2011 | Chen | H04L 1/1861 370/329 |
| 2012/0300662 A1 | 11/2012 | Wang et al. | |
| 2013/0170387 A1 | 7/2013 | Wang et al. | |
| 2013/0182582 A1 | 7/2013 | Bontu et al. | |
| 2013/0336196 A1 | 12/2013 | Abraham et al. | |

OTHER PUBLICATIONS

R2-133840, "CSMA/CA based resource selection," Samsung, published at 3GPP TSG-RAN WG2 #84, San Francisco, USA, Total 4 Pages, (Nov. 11-15, 2013).

R2-133990, "Network control for Public Safety D2D Communications", Orange, Huawei, HiSilicon, Telecom Italia, published at 3GPP TSG-RAN WG2 #84, San Francisco, USA, Total 5 Pages, (Nov. 11-15, 2013).

R2-134246, "The Synchronizing Central Node for Out of Coverage D2D Communication", General Dynamics Broadband UK, published at 3GPP TSG-RAN WG2 #84, San Francisco, USA, Total 3 Pages, (Nov. 11-15, 2013).

R2-134426, "Medium Access for D2D communication", LG Electronics Inc, published at 3GPP TSG-RAN WG2 #84, San Francisco, USA, Total 8 Pages, (Nov. 11-15, 2013).

R2-134238, "D2D Scheduling Procedure", Ericsson, published at 3GPP TSG-RAN WG2 #84, San Francisco, USA, Total 7 Pages, (Nov. 11-15, 2013).

R2-134248, "Possible mechanisms for resource selection in connectionless D2D voice communication", General Dynamics Broadband UK, published at 3GPP TSG-RAN WG2 #84, San Francisco, USA, Total 9 Pages, (Nov. 11-15, 2013).

R2-134431, "Simulation results for D2D voice services using connectionless approach", General Dynamics Broadband UK, published at 3GPP TSG-RAN WG2 #84, San Francisco, USA, Total 6 Pages, (Nov. 11-15, 2013).

Ran Xiaogang, et al., "D2D Resource Allocation under the Control of BS", University of Electronic Science and Technology of China, https://mentor.ieee.org/802.16/dcn/13/16-13-0123-02-000n-d2d-resource-allocation-under-the-control-of-bs.docx, Total 7 Pages, (2015).

Harri Holma, et al., "LTE for UMTS: OFDMA and SC-FDMA Based Radio Access", Wiley, ISBN 978-0-470-99401-6, (Total 4 Pages), (2009).

"D2D Communication in LTE", InterDigital, Tdoc No. R1-132188 3GPP TSG-RAN WG1 Meeting #73 Fukuoka, Japan, (http://www.3gpp.org/ftp/tsg_ran/WG1_RL1/TSGR1_73/Docs/), Total 7 Pages, (May 20-24, 2013).

International Search Report dated Jan. 27, 2016 in PCT/EP2015/075557 Filed Nov. 3, 2015.

* cited by examiner

Combining
(NACK from relay UE is slightly delayed to NACK form destination UE, but it is possible to combine NACKs within certain time range)

COMMUNICATIONS DEVICES AND METHODS

CROSS-REFERENCE TO RELATED APPLICATIONS

The present application is based on PCT filing PCT/EP2015/075557 filed Nov. 3, 2015, and claims priority to European Patent Application 14 193 764.9, filed in the European Patent Office on Nov. 18, 2014, the entire contents of each of which being incorporated herein by reference.

TECHNICAL FIELD OF THE DISCLOSURE

The present disclosure relates to communications devices and methods for communicating data using communications devices, and in particular to communications devices which are configured to perform device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution for public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network, and may also lead to potential compatibility issues between conventional and D2D capable LTE communications devices.

It has been envisaged therefore that there is a requirement to perform D2D communications between a group of communications devices which are outside of a coverage area of an LTE mobile communications network, which may communicate between devices using a repeat request communications protocol or the like.

SUMMARY OF THE DISCLOSURE

According to a first example embodiment of the present technique there is provided a communications device configured to communicate data, in which the data is communicated via a wireless access interface to a destination communications device in accordance with a device-to-device communication procedure. The communications device encodes the data, as a plurality of data units, for transmission to the destination communications device in accordance with a repeat request protocol, the encoding providing redundant data which can improve an integrity of correctly recovering the data when received by the destination communications device and providing an indication of whether the data has been received correctly. The communications device transmits the encoded data units to the destination communications and receives an acknowledgement, ACK, message that one of the encoded data units has been correctly received by the destination communications device, or a negative acknowledgement, NACK, message that the encoded data units was not received correctly by the destination communications device. The repeat request-type protocol may be for example an automatic repeat request protocol (ARQ) or hybrid automatic repeat request (HARQ), or any type of protocol which includes transmitting a feedback ACK or NACK from the receiving or destination communications device. The ACK or the NACK message are transmitted by another of the communications devices of the group of communications devices, acting as an relay communications device, which received and retransmitted the ACK or the NACK message from the destination communications device.

Example embodiments of the present technique can provide an arrangement for device-to device communications in which another of the communications devices within the group is able to detect the ACK or the NACK message transmitted from the destination communications and to re-transmit the ACK message or the NACK message to the source communications device. Accordingly, an improvement in a device-to-device repeat request protocol is provided for situations in which the ACK message or the NACK message may not be received by the source communications device, when the device-to-device communications channel deteriorates.

In accordance with the present technique, further aspects includes a communications device operating as a destination communications device and a communications device operating as an assisting/relay device.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Conventional Communications System

Figure 1:
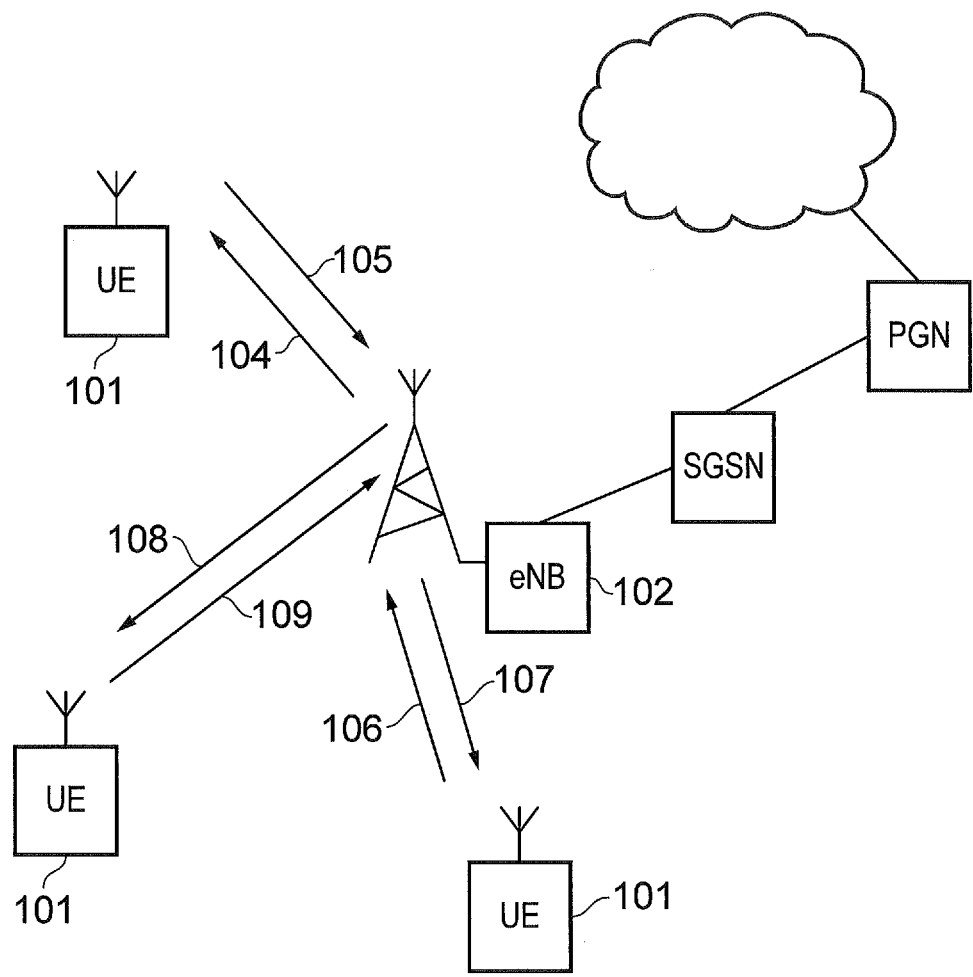
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to core network components such as a serving gateway support node 103 a packet data gateway 103.1 and an external network 103.2, which may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with a 3GPP Long Term Evolution (LTE) standard where the network entity and communications devices are commonly referred to as eNodeB and UEs, respectively.

LTE Wireless Access Interface

A brief description of the LTE wireless access interface is explained in the following paragraphs with reference to FIGS. 2 and 3 to support the explanation of the example embodiments of the present technique which are provided in the following paragraphs.

Figure 2:
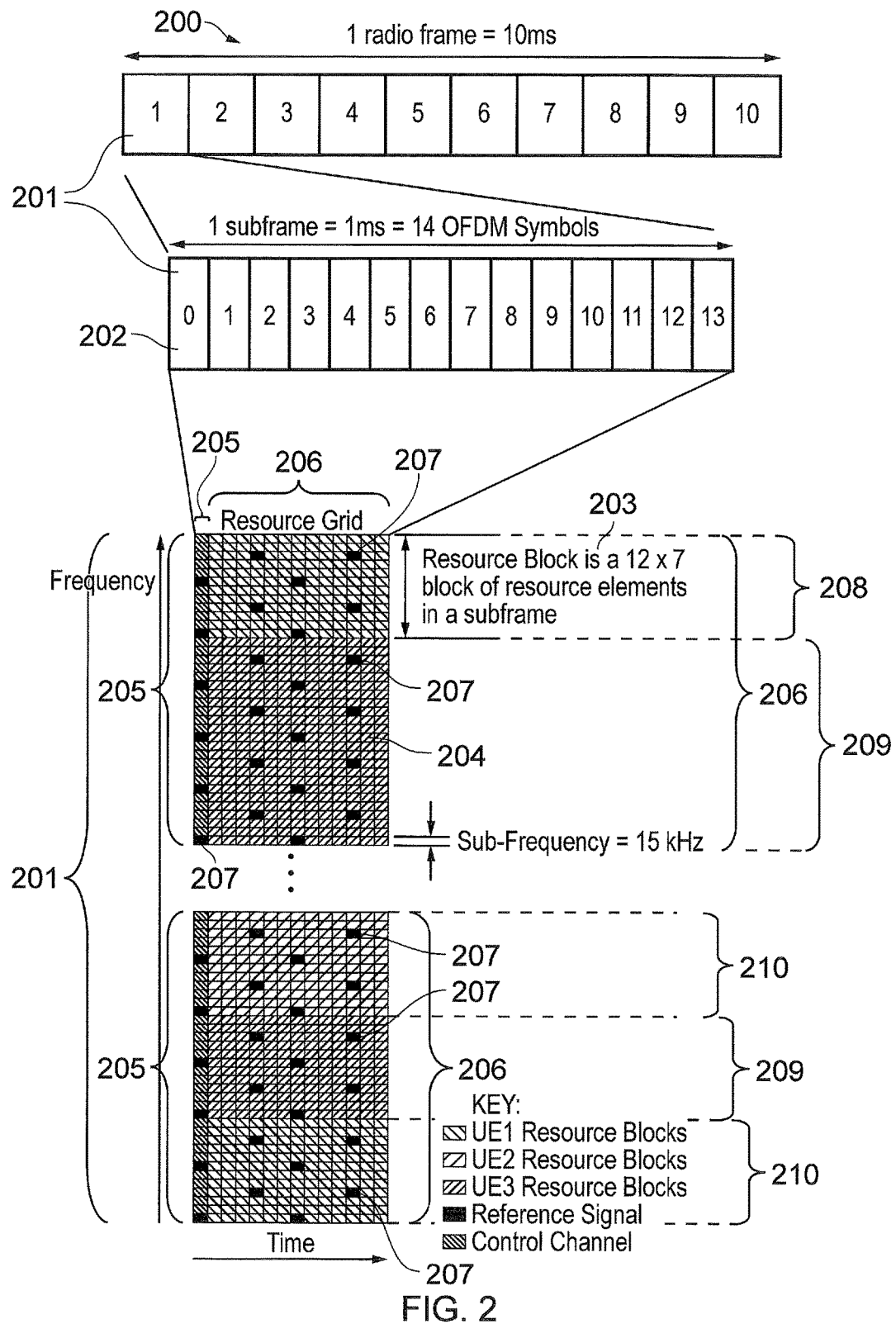
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
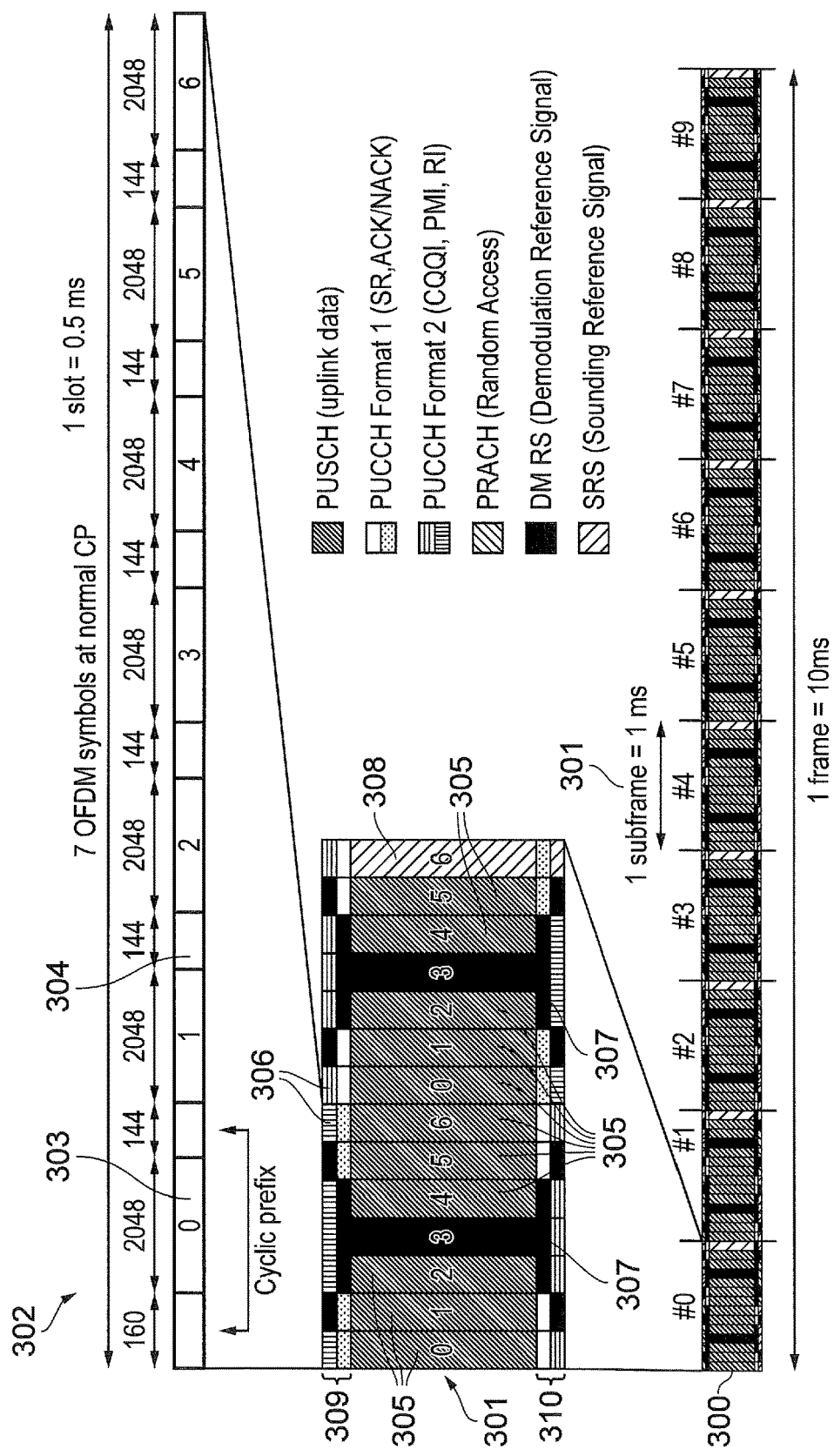
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
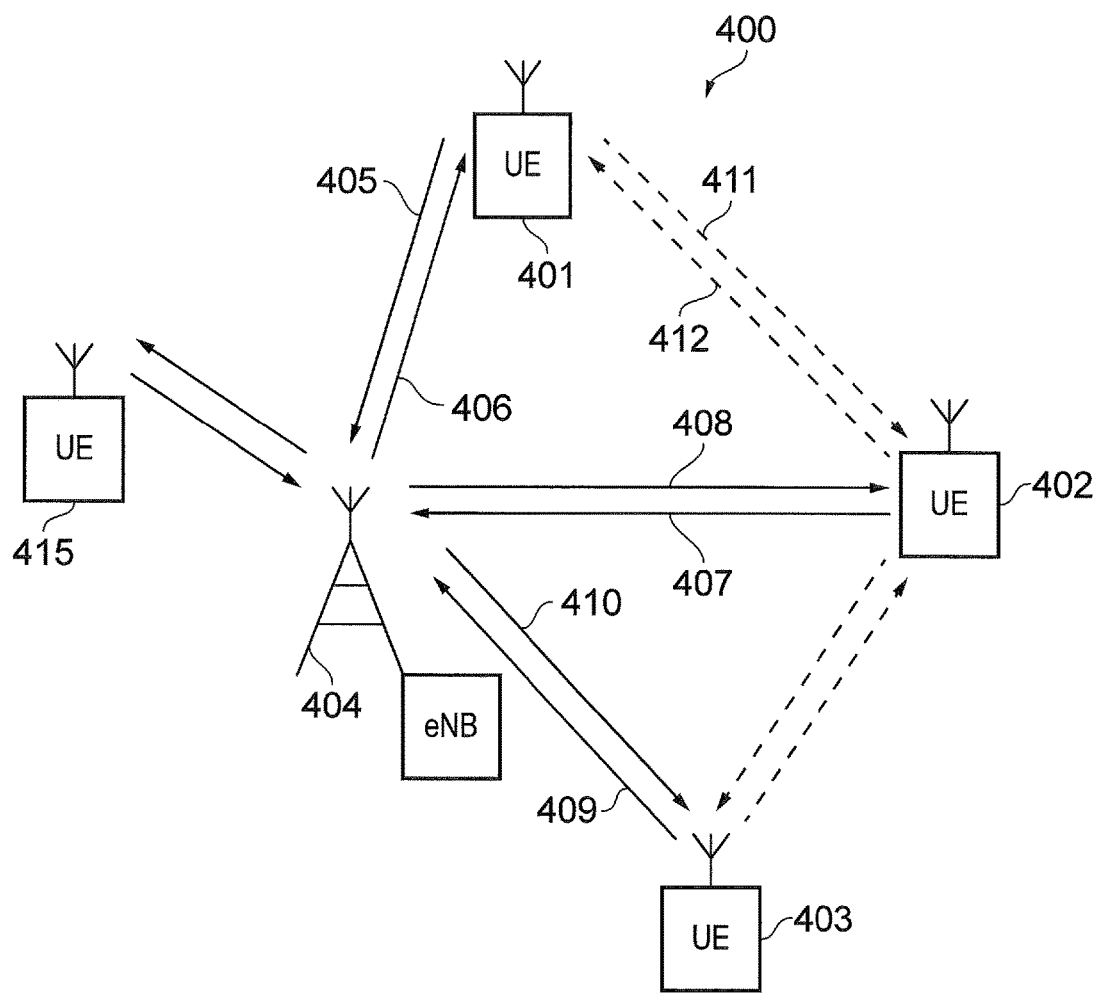
FIG. 4 provides a schematic diagram of a mobile communications system in which communications devices can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401, 402, 403, 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In order to establish a D2D communications link, such a one-way D2D communications link 414 from the UE 402 to the UE 403, a number of steps are required to be performed. Firstly, it is beneficial for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403 it may then proceed to establishing a D2D communications link with UE 403.

Previously Proposed D2D Systems

It has previously been proposed to provide some arrangement for device to device communication within standards which define communications systems according to specifications administered by the 3GPP referred to as Long Term Evolution (LTE). A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following disclosures:

[2] R2-133990, Network control for Public Safety D2D Communications; Orange, Huawei, HiSilicon, Telecom Italia

[3] R2-134246, The Synchronizing Central Node for Out of Coverage D2D Communication; General Dynamics Broadband UK

[4] R2-134426, Medium Access for D2D communication; LG Electronics Inc

In another arrangement one of the UEs of the group first sends a scheduling assignment, and then transmits data without a central scheduling UE or controlling entity controlling the transmissions. The following disclosures provide examples of this de-centralised arrangement:

[5] R2-134238 D2D Scheduling Procedure; Ericsson;

[6] R2-134248, Possible mechanisms for resource selection in connectionless D2D voice communication; General Dynamics Broadband UK;

[7] R2-134431, Simulation results for D2D voice services using connectionless approach General Dynamics Broadband UK In particular, the last two contributions listed above, R2-134248 [6], R2-134431 [7], disclose the use of a scheduling channel, used by UEs to indicate their intention to schedule data along with the resources that will be used. The other disclosure, R2-134238 [5], does not use a scheduling channel as such, but deploys at least some predefined resources to send the scheduling assignments.

Other example arrangements disclosed in [8] and [9] require a base station to provide feedback to the communications devices to control their transmissions. Document [10] discloses an arrangement in which a dedicated resource exchanging channel is provided between cellular user equipment and device-to-device user equipment for interference control and resource coordination.

As a result of the possible approaches to the organisation of a D2D devices and networks, a number of scenarios may arise. A selection of example scenarios are provided by FIGS. 5a to 5d where each may cause different problems regarding the allocation of resources, the operation of D2D communications alongside conventional LTE communication and the movement of D2D capable devices between coverage areas provided by eNodeBs.

Figure 5A:
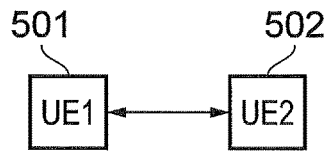
FIGS. 5a to 5d provides schematics diagrams of example device-to-device communications scenarios.

In FIG. 5a UEs 501 and 502 are outside of a coverage area of an eNodeB, consequently, the D2D devices may communicate with little or no regard for interference that may be caused by their D2D communications to neighbouring LTE networks. Such a scenario may occur in public safety communications for example, where either the UEs are outside of a coverage area or where the relevant mobile communications network is not currently functioning correctly. In such a scenario the communicating UEs may either negotiate directly with one another to allocate resources and coordinate communications, or one of the UEs or a third UE may act as a coordinating entity and therefore perform resource allocation.

Figure 5B:
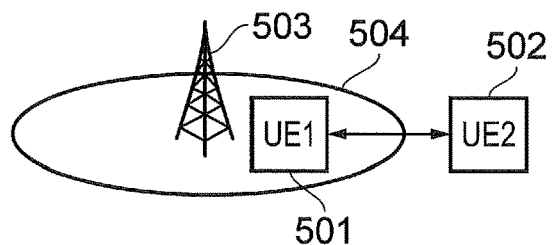

In FIG. 5b UE 501 is within a coverage area 504 of an eNodeB 503 and is performing D2D communications with UE 502 which is outside the coverage area 503. In contrast to the scenario of FIG. 5a, by virtue of UE 501 being within the coverage area of the eNodeB 503, D2D communications may cause interference to conventional LTE communications within the coverage area. Consequently, D2D resource allocations and transmissions may have to be coordinated around those within the coverage area 504 so conventional LTE communications are unaffected by D2D transmissions. This may be achieved in a number of ways, for example the eNodeB may coordinate the resource allocation for the D2D communications so that D2D resources and conventional LTE resources do not overlap. Any allocations may then be relayed to UE 502 by UE 501. Alternatively, UE 1 or UE2 via UE1 may for example perform resource allocation and then inform the eNodeB of the resources being utilised for D2D communications. The eNodeB will then reserve these resources for D2D communications.

Figure 5C:
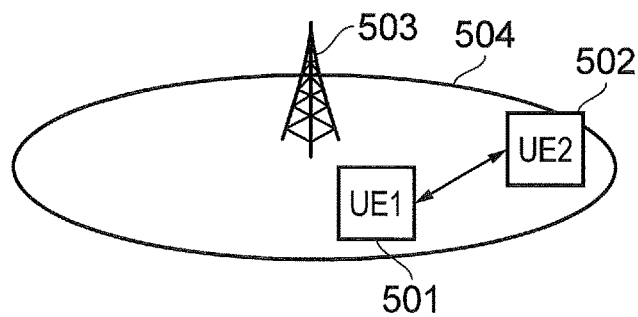

In FIG. 5c both UE 501 and 502 are within the coverage area of the eNodeB 503, consequently, coordination between the eNodeB and UEs will be required if D2D communications are to be performed without causing interference to conventional LTE communications within the coverage area. Such coordination may be achieved in a similar way to that described with reference to FIG. 5b but in the case of FIG. 5c UE 502 is also within the coverage area and therefore the relaying of resource allocation signals by UE1 to the eNodeB from UE 2 may not be required.

Figure 5D:
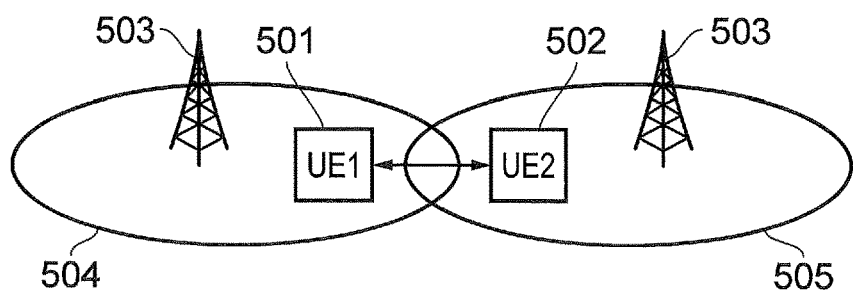

In FIG. 5d a fourth more complex D2D scenario is illustrated, where UE 501 and UE 502 are each within the coverage areas 504 505 of different eNodeBs 503 and 504 respectively. As for the scenarios of FIGS. 5b and 5c, coordination between the UEs performing D2D communications will be required if interference between D2D communications and conventional LTE communications is to be avoided. However, the presence of two eNodeB requires that resource allocations by the eNodeBs within the coverage areas 504 and 505 are required to be coordinated around the D2D resources allocations.

FIGS. 5a to 5d illustrates just four of a large number of possible D2D usage scenarios, where further scenarios may be formed from combinations of those illustrated in FIGS. 5a to 5d. For example, two UEs communicating as shown in FIG. 5a may move into the usage scenario of FIG. 5d such that there are two groups of UEs performing D2D communications in the coverage areas of two eNodeBs.

Once a D2D communications link is established resources of the wireless access interface are required to be allocated to the D2D link. As described above it is likely that D2D communication will take place in spectrum allocated for LTE networks, consequently it has been previously proposed that when within a coverage area of an LTE network, D2D transmission are performed in the uplink spectrum and that SC-FDM is used. Furthermore, as one of the motivating factors behind D2D communication is the increase in capacity that may result, utilising the downlink spectrum for D2D communications is not appropriate.

As previously described it would be desirable to provide an arrangement for D2D communications which do not significantly adversely affect conventional LTE communications when within a coverage area of one or more eNodeBs. To accomplish D2D communications in such situations, coordination is required between the UEs wishing the preform D2D communications and the serving eNodeB or predetermined knowledge of D2D resources are required, so that D2D and conventional LTE communications are not scheduled for a same set of resources. Furthermore, because D2D communications may coexist with conventional communications within a system, it is also desirable that D2D resource allocations and transmission do not interfere and are transparent to other UEs so any adverse effects on other UEs are reduced.

Figure 6:
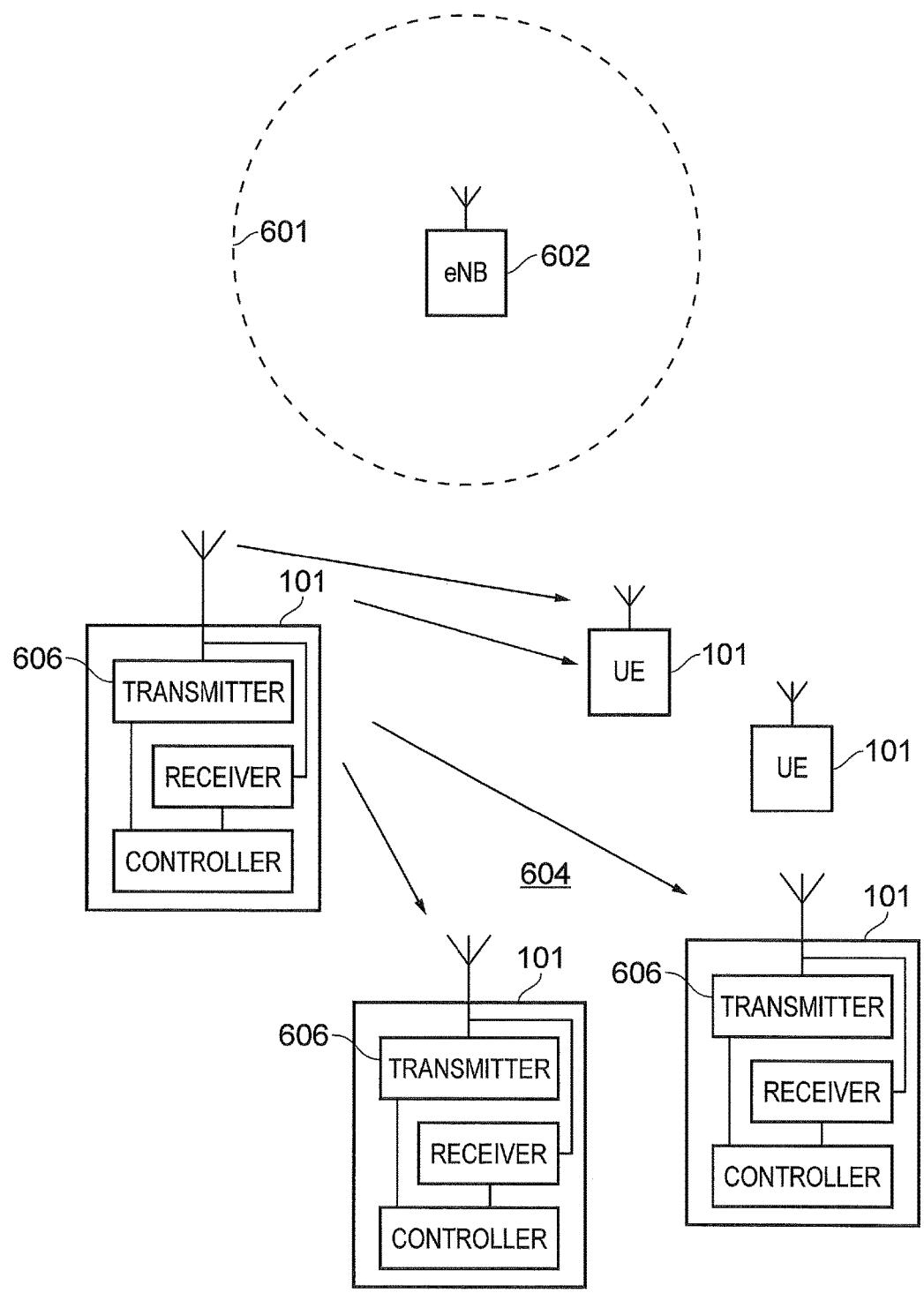
FIG. 6 provides a schematic block diagram illustrating an arrangement in which a plurality of communications devices form a group which perform device-to-device communications.

An example application is presented in FIG. 6. In FIG. 6, a plurality of communications devices 101 form a group of communications devices for which D2D communications is desired for the reasons explained above. As represented in FIG. 6, the communications devices 101 are outside a coverage area represented by a broken line 601 of a base station 602. As such the base station 602 cannot form or control any of the communications between the devices. However as mentioned above in some examples the group of communications devices may operate within a coverage area provided by the base station 602 and accordingly it is desirable that the transmission of signals by the communications devices 101 does not interfere with transmissions to or from the e-Node B 602 by conventional communications devices. As such, in some examples, a wireless access interface which is formed by the communications devices 101 for performing the D2D communications may utilise an uplink frequency of a conventional communications device. The wireless access interface can be arranged to transmit signals to the eNode B 602 when operating in a conventional mode, and to transmit and receive data via a mobile communications network of which the base station 602 forms a part.

As shown in FIG. 6, each of the UEs 101 includes a transmitter 606 and a receiver 608, which perform the transmission and reception of signals under the control of the controller 610. The controller 610 control the transmitter 606 and the receiver 608 to transmit and receive data between members of the group to perform D2D communications.

In the European patent application EP14153530.2 there is disclosed an arrangement for performing contentious resolution for device to device communications. Similarly an arrangement for allocating resources using a scheduling assignment messages transmitted in a scheduling assignment region of an uplink transmission frame is disclosed in European patent application 14153512.0. An arrangement in which communications devices of limited capability which may form machine to machine communications devices can be arranged to perform device to device communications within a limited set of resources (referred to as a virtual carrier) as disclosed in European patent application 14153536.9. Furthermore, an arrangement for identifying resources which can be used for device to device communications between a group of communications devices is disclosed in European patent application 14153540.1, the content of all of the above European patent applications are incorporated into the present application by reference.

Improved Device-to-Device Communications

Those acquainted with LTE will know that communications devices operating within a coverage area of an eNodeB are configured to transmit data using a hybrid automatic repeat request (HARQ) technique. As those familiar with HARQ will appreciate, data is transmitted using an HARQ technique by dividing the data into data units and encoding each data unit using a forward error correction code introducing redundant data into a resulting encoded data unit. The data may also be encoded to provide a separate parity check reference. Once the data has been transmitted from a transmitter to a receiver, the encoded data unit is decoded at the receiver, and the cyclic redundancy check is recalculated. If the cyclic redundancy check fails, then the data unit is concluded as being received in error. A negative acknowledgement (NACK) is transmitted, by the receiver or destination device to the transmitter device, which then either retransmits the encoded data unit or transmits more of the redundant data, which has been calculated for the encoded data unit. However, if the encoded data unit has been decoded successfully at the receiver then an acknowledgement (ACK) is transmitted to the transmitter. The transmitter can then transmit the next encoded data unit. In accordance with a conventional LTE arrangement, when a communications device is transmitting and receiving data via a base station or eNodeB, the ACK/NACK signals are transmitted as part of or piggybacked on to other control signals thereby making efficient use of the available communications resources.

In respect of device-to-device (D2D) communications an arrangement for HARQ has only been proposed in respect of a communications device transmitting data to a group of communications devices in accordance with a D2D communications protocol. This HARQ mechanism has been proposed for LTE release 12. However currently there is no proposal for one to one communications in respect of an HARQ scheme. That is the transmission of data from one communications device to another, when out of a coverage area of the LTE network, using a D2D communications protocol. In the case of a transmission of data to a group of devices, then any of the receiving devices of the group could transmit a NACK or ACK. In contrast for a one to one D2D communication, an ACK/NACK can be transmitted to the transmitting communications device (UE) to perform HARQ. Accordingly, in release 12 of LTE for D2D communications there is a "blind" HARQ transmission to improve reliability of one to many transmissions.

Figure 7:
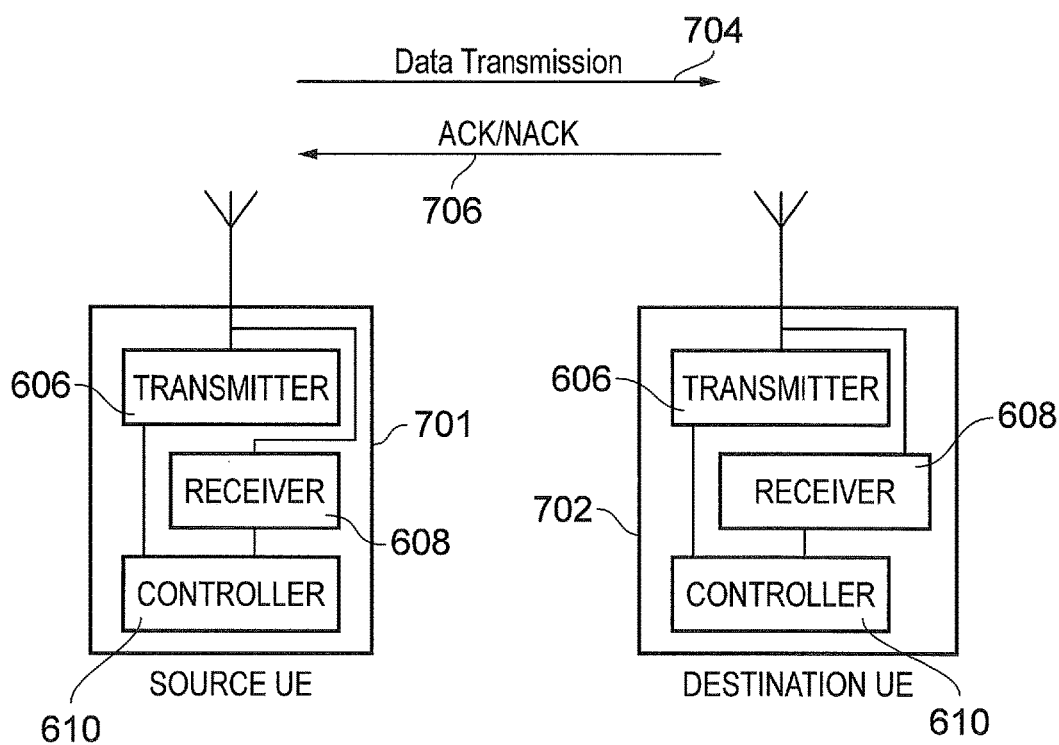
FIG. 7 is a schematic representation of a source communications device and a destination communications device performing device-to-device communications in accordance with a Hybrid ARQ process.

FIG. 7 provides an example block diagram of two communications devices performing data transmission using an HARQ protocol. As shown in FIG. 7 one of the group of communications devices shown in FIG. 6 acts as a source UE 701 and another of the group of communications devices of the group shown in FIG. 6 acts as a destination or receiving UE 702. Each of the source 701 and destination UE 702 includes a transmitter 606, a receiver 608 and a controller 610. As represented by a first arrow 704 the source UE is arranged to transmit data to the destination UE 702 using an HARQ technique and so the destination UE 702 transmits an ACK or NACK signal represented by a second arrow 706 depending on whether the destination UE 702 has been able to receive and correctly recover a block of data (data unit) represented by the data transmission 704. Such a conventional arrangement is represented in FIG. 8.

Figure 8:
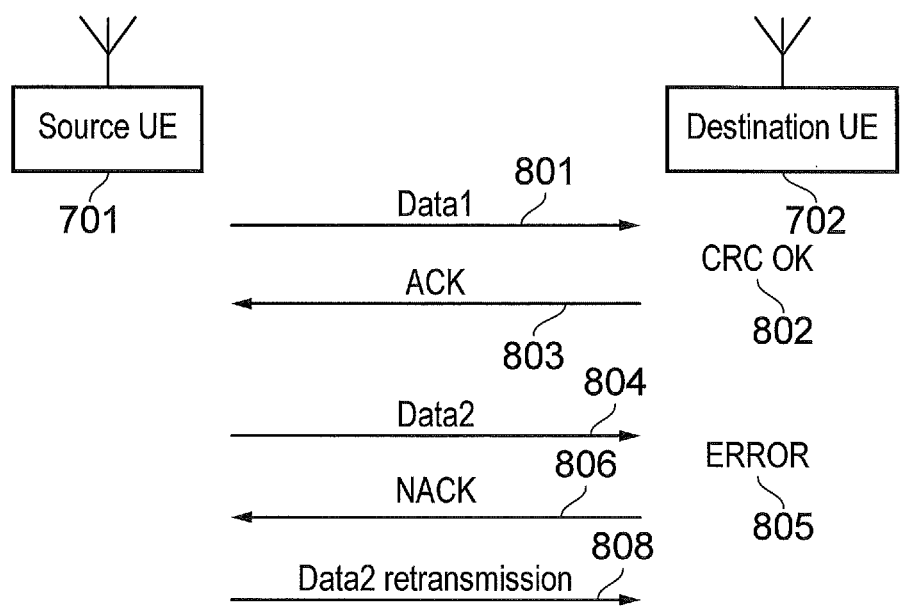
FIG. 8 is a part flow diagram part representation of a message exchange between a source communications device and a destination communications device representing a conventional Hybrid ARQ process for supporting device to device communications.

In FIG. 8 the source UE 701 transmits a first data unit represented by a first arrow 801. If the destination UE 702 recovers the data and the cyclic redundancy check (CRC) is correct then an ACK message is transmitted as represented by a second arrow 802. If the first data unit 801 was received correctly then the source UE 701 proceeds to transmit a second data unit of a set of data units comprising a data transmission as represented by a third arrow 804. However if the cyclic redundancy check fails when the destination UE 702 attempts to recover the data represented by the second data unit 804, and then a NACK is transmitted as represented by a fourth arrow 806. In that case the second data unit is retransmitted as represented by a fifth arrow 808. Such an arrangement can correspond to a conventional HARQ process.

Embodiments of the present technique can provide an improvement in an HARQ technique for one-to-one D2D communications. In accordance with a conventional arrangement as presented in FIG. 8, the transmission of a data unit in accordance with D2D communications protocol requires that the destination UE 702 always transmits an ACK or NACK message respectively to the source UE. However, in some circumstances the source UE 701 may not receive an NACK or ACK message, which has been transmitted by the destination UE 702, which can result in a breakdown of the HARQ transmission scheme. This is particularly true where the destination UE is transmitting a NACK message, because if an ACK is not received by the source UE 701, then this will be interpreted as an NACK and so the data unit re-transmitted, albeit un-necessarily, which will was communications resources. However a NACK message is more likely not to be received by the source UE 701, when transmitted by a destination UE 702, because for D2D communications the transmission and reception of signals by UE is, according to the D2D protocol on the same time and frequency resources. Therefore, if the data unit is transmitted on the same channel conditions as the ACK/NACK transmission and the data unit is not received correctly by the destination UE 702, then the source UE 701 may correspondingly be likely not to receive the NACK message transmitted to the destination UE 702, when the data unit has not been received correctly.

Known arrangements for providing assistance to communications devices which are performing a HARQ process include that disclosed in technical document (Tdoc) number R1-132188 entitled "D2D Communication in LTE", disclosed at 3GPP TSG-RAN WG1 Meeting #73 Fukuoka, Japan, 20-24 May 2013 [12]. In this known arrangement D2D ACK/NACK relaying is provided via an LTE base station (eNB). Two techniques are employed, an indirect method and a direct relaying method via the base station, so that this disclosure only relates to D2D communications whilst in coverage of a network. Direct HARQ for the D2D communication link relies on the principle that ACK/NACK messages corresponding to the D2D PUSCH are sent back from the D2D receiver UE to the D2D transmitter UE in allocated D2D uplink subframes. Indirect HARQ for the D2D communication link is based on the principle that ACK/NACK messages as determined by the D2D receiving UE is first sent to the base station using a cellular uplink and the base station relays this ACK/NACK to the D2D transmitting UE using the cellular downlink. These two different approaches, indirect vs. direct HARQ for D2D communication links result in very different consequences on radio resource utilization and in different operational constraints for signal design.

Indirect HARQ for the D2D communication link can only be supported in presence of a central controller node. When operating under network coverage, indirect HARQ for D2D communication across cell/sector borders can be supported only if neighbour base stations are centrally scheduled from the same site.

Assistance from Neighbour UE

According to an example of the present technique, if the destination UE 702 has transmitted an ACK or NACK message, which has not been received by the source UE 701 because the channel quality is too poor, then in accordance with a D2D communications technique, the data unit will have been transmitted on the same frequency as other UEs which are engaged in D2D communications. According to the present technique, another UE in a group of three or more UEs 604, which includes the source UE 701 and destination UE 702 is arranged to assist in the transmission of the ACK or NACK message 706 from the destination UE 702 to the source UE 701.

In D2D communications data transmission may fail as a result of a data unit not being decoded. For the example in which the destination UE 702 transmits a NACK message, there is a possibility that the NACK message may not be received by the source UE 701 because the channel quality is poor for the transmission of the ACK/NACK message 706 as well as for the transmission of the data unit by the source UE 701. As explained above, this may be because the data unit and the ACK/NACK message 706 are transmitted on the same frequency for a D2D communication (similar to TDD). According to one example the source UE 701 can receive the ACK/NACK message 706 from another UE, by relaying the ACK/NACK message, which can be received via a common D2D communications interface. In one example, when the source UE 701 does not receive a ACK/NACK message 706 from the destination UE 702, then the source UE 701 may attempt to send the data unit again, for example, by a retransmission with systematic bits of the error correction code, so that so called chase combining can be used. When the UE receives the partial data unit but fails to decode the data unit, then the destination UE 702 sends a NACK message. The source UE 701 should then send the data unit with a different amount of redundant data to improve the likelihood that the destination UE 702 will be able to detect the data unit correctly. This is a combination of incremental redundancy so that more parity bits are sent increasing the power of the error correction decode to recover the data unit.

Figure 9:
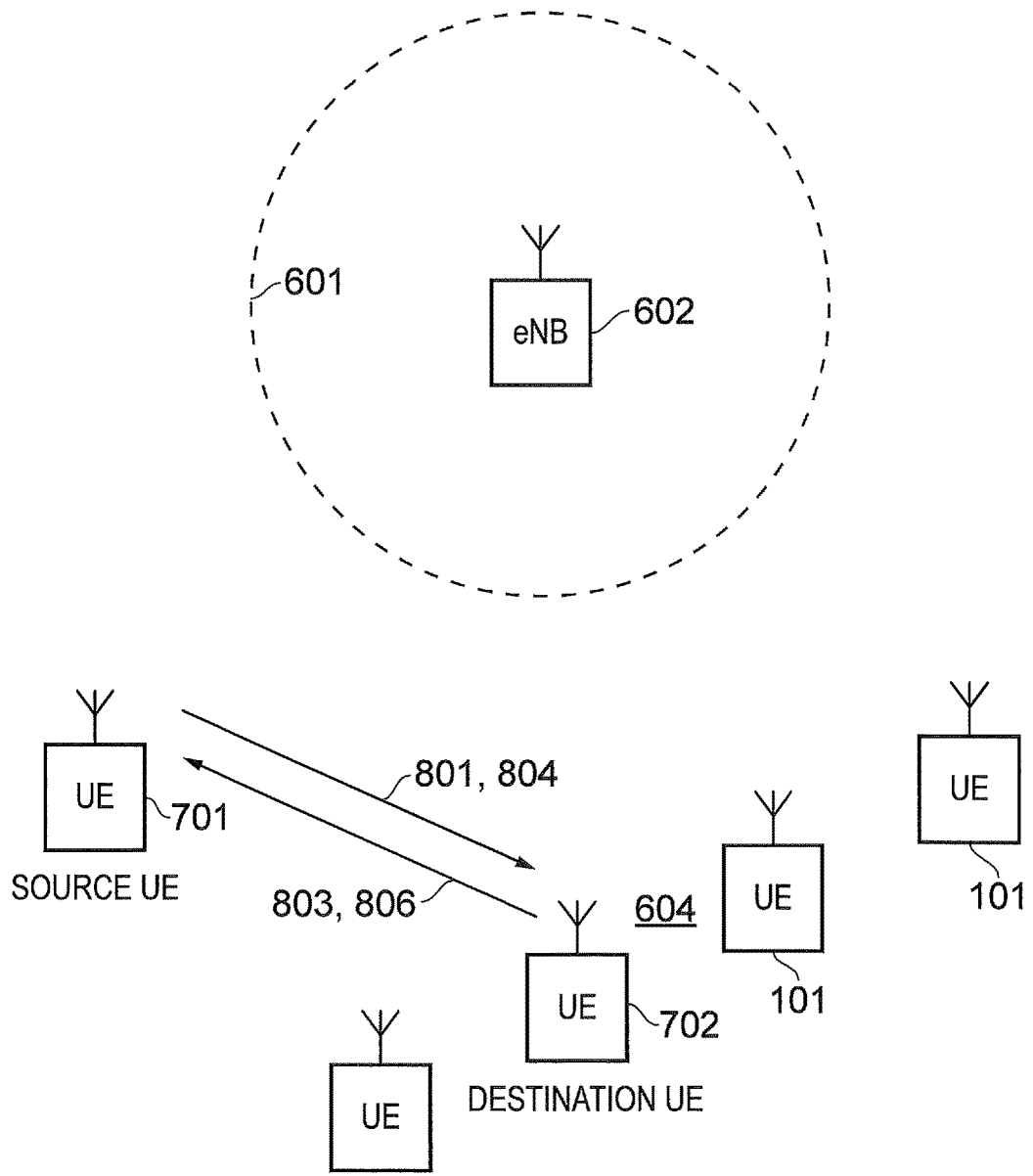
FIG. 9 is a schematic block diagram representing an arrangement in which a group of communications devices perform device-to-device communications, and in which a source communications device transmits data in accordance with a repeat request protocol in accordance with the present technique in which at least one other communications device assists by acting as a relay node.
Figure 10:
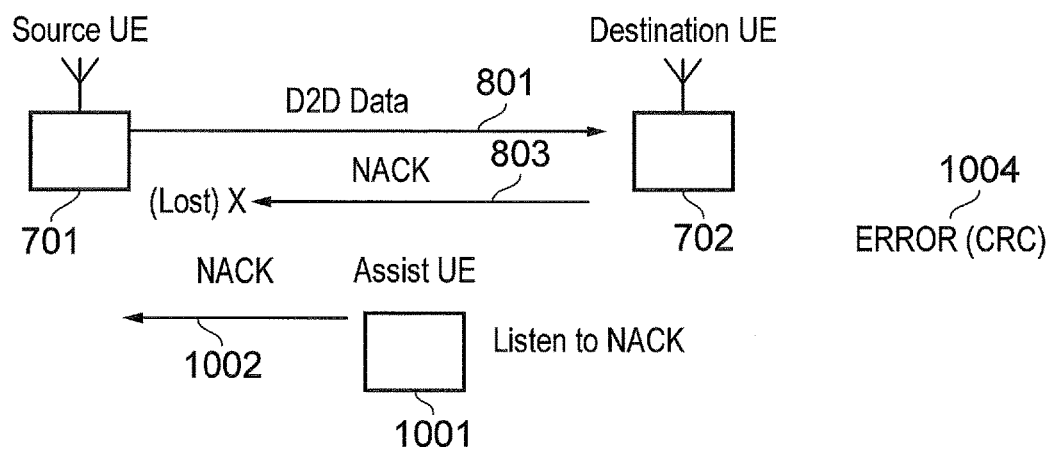
FIG. 10 is a part flow diagram part representation of a message exchange between a source communications device and a destination communications device representing a repeat request process for supporting device to device communications according to an example of the present technique, in which another communications device acts as a relay node.
Figure 11:
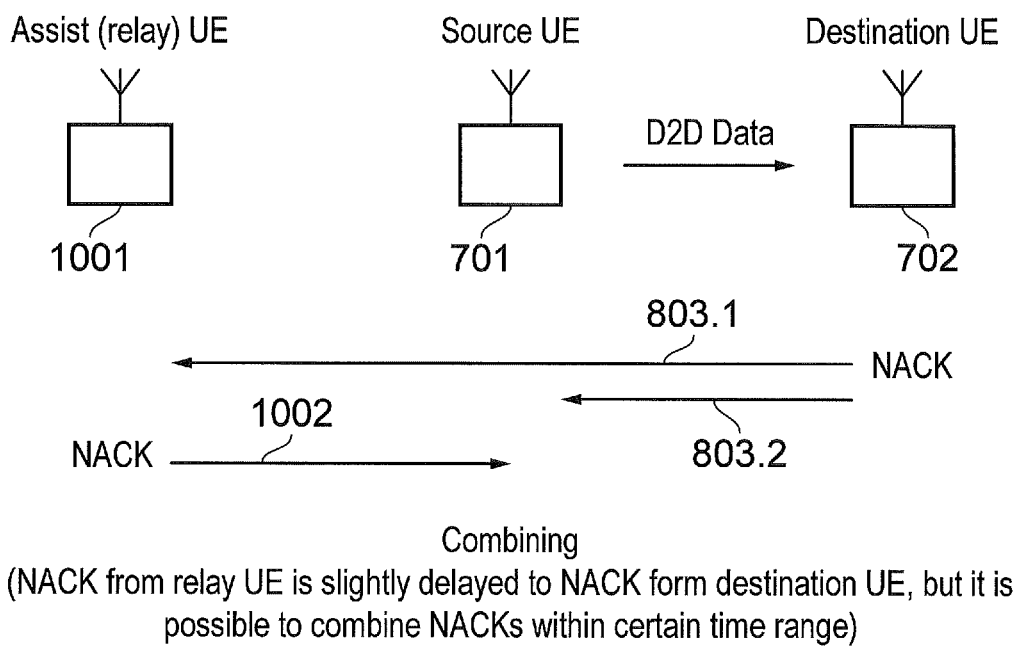
FIG. 11 is a part flow diagram part representation providing a further example of a message exchange between a source communications device and a destination communications device representing a repeat request process according to the present technique, in which another communications device acts as a relay node and the source communications device combines ACK/NACK messages received from the destination communications device and the assisting/relay communications device.

In summary therefore, the source UE 701 is not able to select an appropriate level of redundancy for retransmission. Therefore in this case it is difficult for the source UE 701 to know whether the destination UE 702 will send a NACK message or send nothing. However, FIG. 9 provides an example embodiment in which a different UE 1001, which is neighbouring at least one of the source UE 701 and the destination UE 702 can assist the source UE 701 to receive the ACK/NACK message. As shown in FIG. 10, the source UE 701 transmits the data unit as represented by a D2D transmission as a first arrow 801. At a process point 1004 the destination UE 702 attempts to decode the received data unit 801 represented by the first arrow 801 and performs a CRC check. However, if this fails then the destination UE 702 concludes that it has not received the data unit for this transmission. Accordingly, the destination UE 702 transmits a NACK message as represented by the second arrow 803. However, in this example, the NACK message 803 is not received by the source UE 701 and is therefore lost. As explained above, because the transmission between the source UE 701 and the destination UE 702 is via a D2D communication, that is on the same frequency channel. As such all UE's which are performing D2D communications can detect the NACK 1002, if they are within a range, which means that the radio link quality is good enough to receive the NACK at one of the UEs. Accordingly, a third UE 1001 can detect the NACK transmitted from the destination UE 702 as represented by the second arrow 803 and retransmits the received NACK message to the source UE 701 as represented by the third arrow 1002.

According to this arrangement a neighbouring UE 1001 assists in the NACK transmission by listening to ACK/NACK message 706, 803 from the destination UE 702. Then the neighbouring UE 1105 receives the NACK, the neighbouring UE 1105 retransmits the NACK to the source UE 701. In this example embodiment the NACK message 803 may have included an identifier that indicates to the destination UE 702 which transmitted the NACK message 803 or in contrast identifies the source UE 701 which is to receive the NACK message 803.

For the example shown in FIG. 10, the destination UE 702 transmits a NACK message to the source UE 701, because the data unit 801, which has been transmitted in accordance with a D2D communication was not received correctly, as determined for example because the CRC check 1004 of the received data unit failed. In one example, when the source UE 701 does not receive a ACK message, then this is interpreted as a failed transmission of the data unit. This example represents a fail-safe procedure, compared to an example in which only NACK messages are sent and ACK messages are not used, because the absence of the NACK represents an ACK. If only ACK messages are used and not the NACK messages then receiving no message transmission represents a NACK, and so re-transmission occurs. This example arrangement is as disclosed in our co-pending European patent application number EP14186921.4. In the example in which an ACK is not received, which is interpreted as a NACK, then the source UE 701 re-sends the original data unit, for which an ACK was not received. This could for example be implemented as the retransmission with systematic bits, which is so-called chase combining. When destination UE 702 receives the partial data, but fails to decode the data unit, the destination UE 702 sends a NACK message. The source UE 701 should then re-send the data unit with different or increased redundant data in the form for example of an error correction encoded data unit with a lower rate. Alternatively this could be implemented, for example, as a retransmission with parity bits, so-called incremental redundancy. Accordingly, there is higher gain for error correction with additional parity bits. As such, therefore there is a drawback is for source UE 701 because it is not able to select a suitable amount of redundancy for retransmitting the data unit. Therefore, it is helpful for the source UE 701 to receive the NACK message or nothing (DTX of NACK message).

UE Relay Procedure

As explained above, for this example in which a UE acts to assist the transmission of a NACK/ACK message 803.1, 803.2, a neighbouring UE 1001 acts as a relay. To this end, the neighbouring UE 1001 is assumed to be within a group of UEs 604, which are arranged to perform D2D communications. Each of the UEs within the group 604 has a different identifier within the group, which is included in the ACK/NACK messages 806, when transmitted, or when transmitting data units. The UEs within the group of UEs 406, also include a common group identifier when transmitting either ACK/NACK messages 803.1, 803.2 or data units in accordance with a HARQ protocol. One of the UEs of the group, which acts as a relay node/assistant is in location in which communication with both the source UE 701 and the destination UE 702 is good. There could also be other UEs of the group, which are in a location to assist both the source and the destination UEs 701, 702. According to an example arrangement, the relay/UE assistance arrangement is as follows, in which ACK/NACK should be read as ACK or NACK in accordance with embodiments of the present technique:

S1: The source UE 701 is configured to start a communications session of D2D communication, for example by sending an INVITE message according, for example, to a SIP protocol.

S2: The source UE 701 indicates to the group of UEs for D2D communication the resource pool for data and the resource for ACK/NACK to destination UE 702.

S3: The source UE 701 provides an indication of the communications resources for ACK/NACK to any UE(s) able to assist. If there is more than one UE, which is able to assist then two examples are where there are common communications resources available to the UEs of the group or dedicated communications resources are provided for each if the UEs of the group.

S4: The destination UE 702 is arranged to configure its receiver to receive signals within the indicated resource pool.

S5: Any UE, which is able to assist in the communication of the ACK/NACK message is arranged to configure its receiver to receive ACK/NACK messages 803.1, 803.2.

A procedure for communication of the ACK/NACK messages 803.1, 803.2 via an assisting UE 1001 is therefore as follows:

S10: The source UE 701 sends scheduling assignments to the destination UE 702. Since the scheduling assignments can be transmitted in accordance with a D2D protocol, the assisting/relay UE 1001 is also able to detect the scheduling assignments in which the ACK/NACK messages will be transmitted.

S11: The source UE 701 transmits data units to the destination UE 702.

S12: The destination UE 702 receives data units and transmits an ACK/NACK feedback message 803.1 in accordance with a conventional HARQ arrangement.

S13: An assisting UE 1001 receives the ACK/NACK message 803.1 from the destination UE 702.

S14: The assist UE 1001 relays the ACK/NACK message 803.2 to the source UE 701, typically after some delay after receiving the ACK/NACK message 803.1 from the destination UE 702.

S15: The source UE 701 then decodes the ACK/NACK message 803.1, 803.2. In some examples as explained below, the ACK/NACK messages 803.1, 803.2, which are received respectively from the destination UE 702 and the assisting/relay UE 1001 may be combined to improve a likelihood of receiving the ACK/NACK message.

S16: At a later point, when the source UE 701 continues to transmit data units, the destination UE 702 may receive a data unit and may transmit an ACK/NACK message 803.1. However the source UE 701 may not detect the ACK/NACK message 803.1.

S17: The assisting UE 1001 detects the ACK/NACK message 803.1 from the destination UE 702 and transmits the ACK/NACK message 803.2 to the source UE 701.

Decoding ACK/NACK

Figure 12:
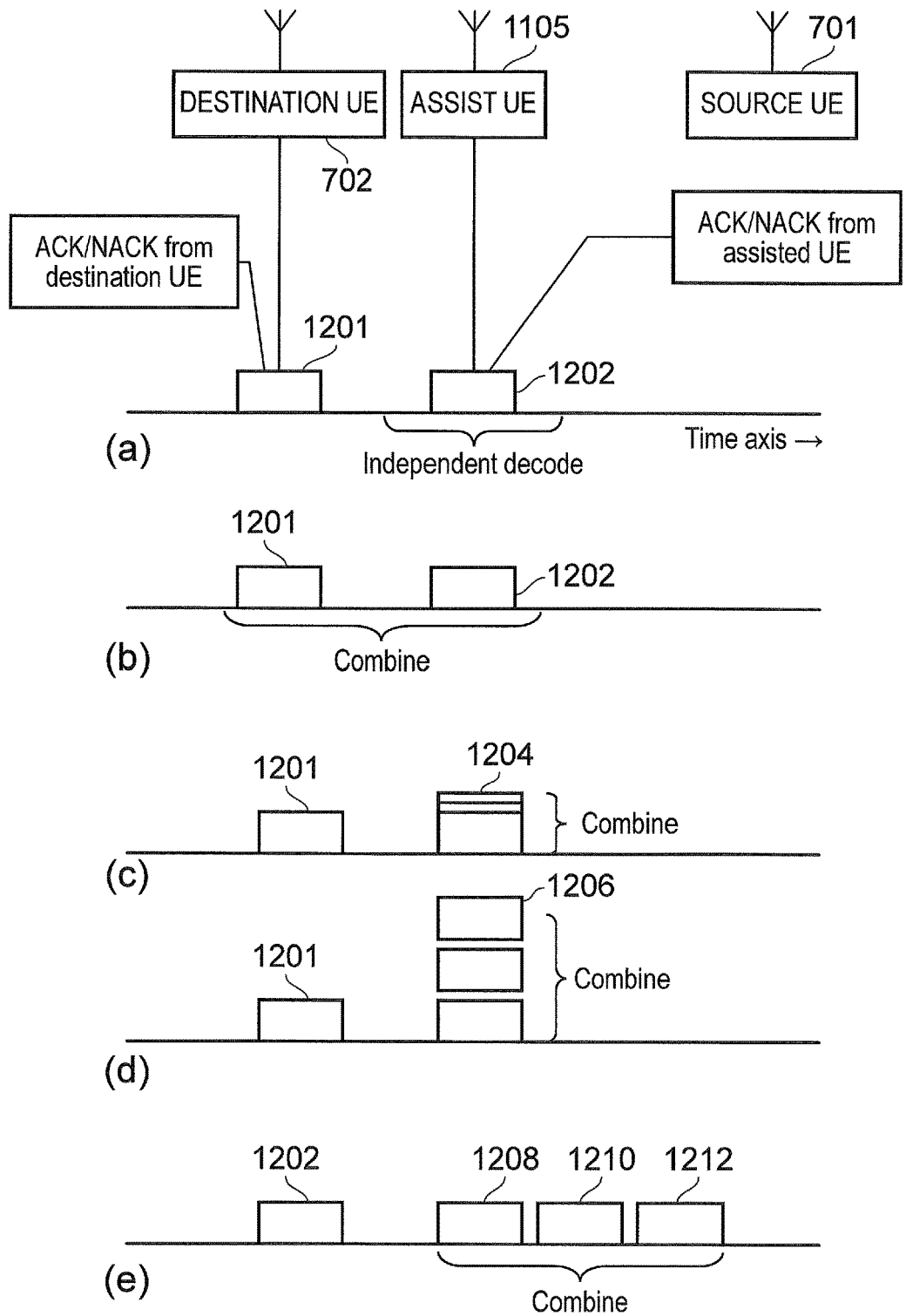
FIG. 12 is a schematic representation illustrating five examples (a) to (e) in which another communications device in a group of communications devices can assist in transmitting an ACK/NAK from a destination communications device to a source communications device.
Figure 13:
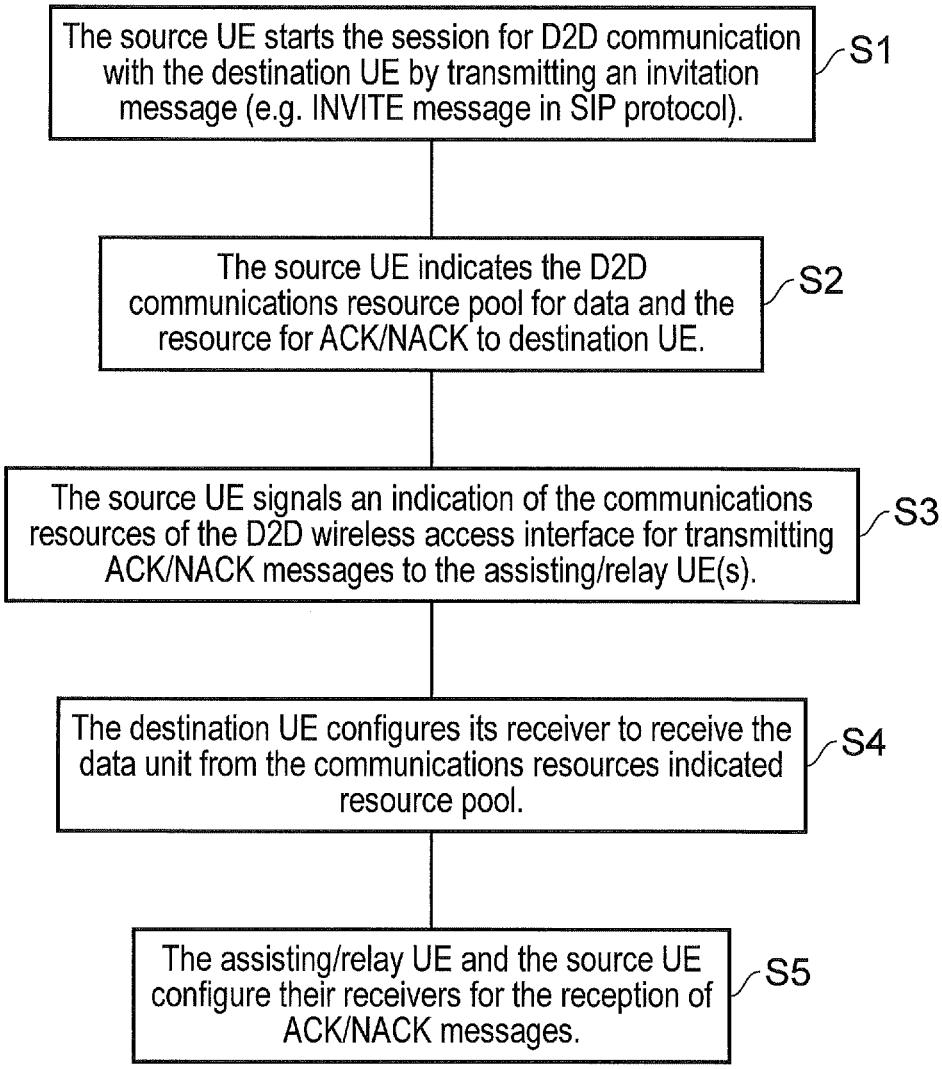
FIG. 13 provides an example flow diagram illustrating a process in which a group of communications devices are established for D2D communications, which supports data communications in accordance with a repeat request process.
Figure 14:
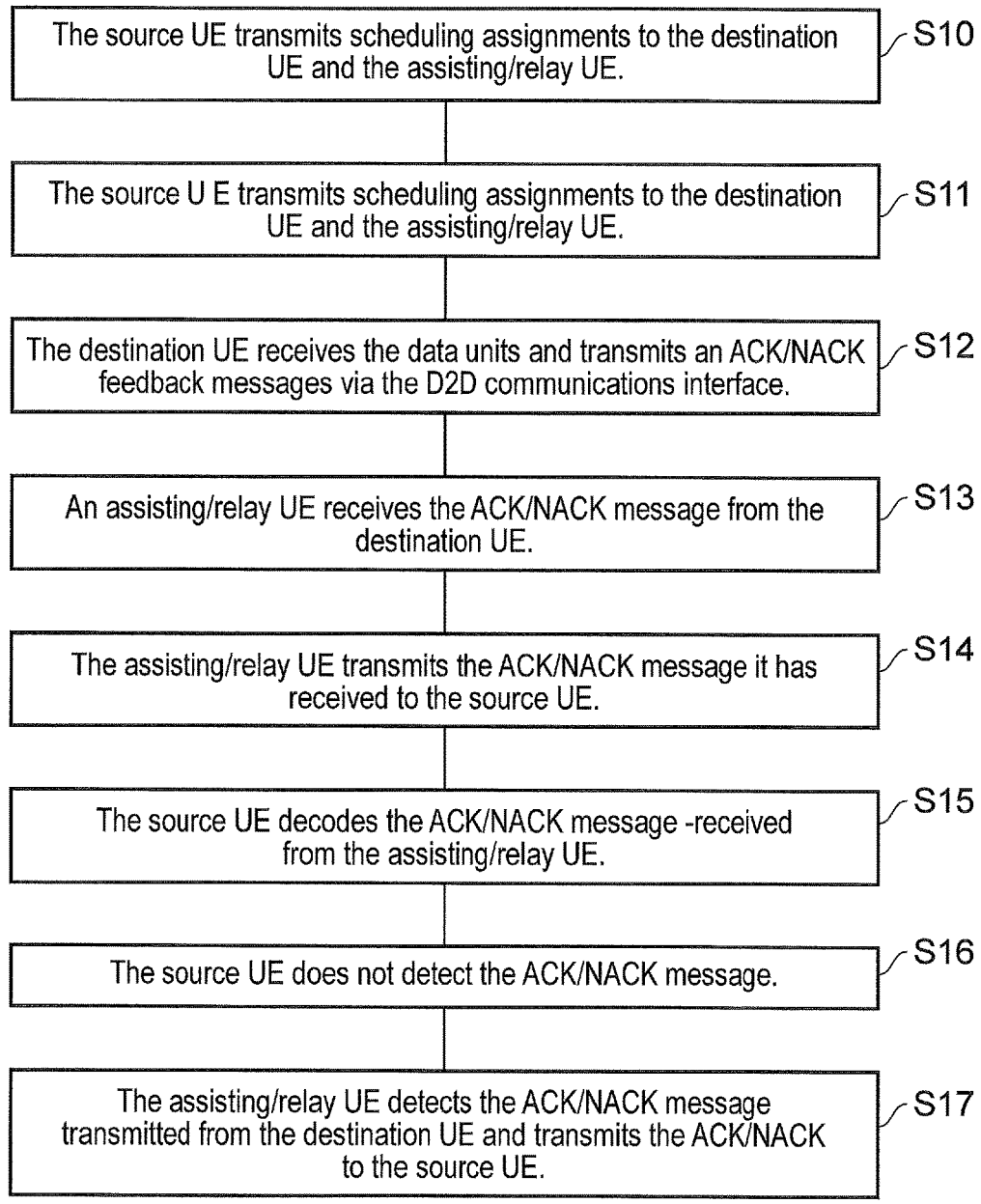
FIG. 14 provides an example flow diagram illustrating a process in which a source communications device transmits data to a destination communications device in which one of the communications devices in the group of communications devices acts as a relay node for ACK/NACK messages of the repeat request process.

There are various options for decoding the ACK/NACK at the source UE 701. Some alternatives of decoding and combining are illustrated in FIG. 12, and are summarised as follows:

a. Independent receive; In a first example the ACK/NACK 1201 transmitted by the destination UE 702 is received and transmitted by the assisting UE 1105 as a separately transmitted ACK/NACK 1202. The source UE 701 receives the ACK/NACK 1202 from the assisting UE 1105 and independently decodes the ACK/NACK.

b. Chase combining; In a second example, the source UE 701 receives the ACK/NACK 1201 from the destination UE 702 and also the ACK/NACK from the assisting UE 1105 separately and combines them. This is useful if the ACK/NACK from destination UE 702 is corrupted on reception, and is received with a reduced degree of quality. The chase combining also could be applicable for the following alternatives.

c. Coherence combining with same resources; In this example the source UE 701 receives more than one ACK/NACK 1204 simultaneously from multiple Assist UEs and combines them at a symbol level. The advantage is to consume smaller resources, but the accuracy of synchronization is required among UEs.

d. Non coherence combining with separate resources; The source UE 701 receives ACK/NACK 1206 separately from multiple Assist UEs and then combines them at Log-Likelihood Ratio (LLR) level. This alternative provides an advantage to flexibility of receiving with separate resources.

e. As a further extension of the example provide in d., ACK/NACKs 1208, 1210, 1212 are transmitted by different assisting UEs 1105 at different times on time separated communications resources.

Example Aspects and Features

According to the present technique, in accordance with the example embodiments presented in FIGS. 9 to 12, the following example devices can be employed:

Source UE

According to a first example embodiment there is provided a communications device, which is arranged in accordance with the present technique to operate as a source communications device. The communications device includes a transmitter configured to transmit signals to one or more other communications devices via a wireless access interface to perform device-to-device communications, a receiver configured to receive signals from the one or more other communications devices via the wireless access interface, and a controller for controlling the transmitter and the receiver to transmit or to receive the signals via the wireless access interface to transmit or to receive data represented by the signals. The transmitter is configured with the controller to encode the data, as a plurality of data units for transmission to a destination communications device in accordance with a repeat request protocol, the encoding providing redundant data which can improve an integrity of correctly recovering the data when received by the destination communications device and providing an indication of whether the data has been received correctly. The controller with the transmitter and/or receiver are arranged to reserve, in accordance with a device-to-device communications procedure, communications resources for transmitting the encoded data units to the destination communications device, in accordance with the repeat request protocol. In some examples the source UE establishes the communications resources using a scheduling assignment message, which is detected by other UEs of the group. The controller with the transmitter transmit the encoded data units to the destination communications device in the reserved communications resources, and the receiver is configured to receive, an acknowledgement, ACK, message that one of the encoded data units has been correctly received by the destination communications device, or a negative acknowledgement, NACK, message that the encoded data unit was not received correctly by the destination communications device. The ACK or the NACK message are transmitted by another of the communications devices of the group of communications devices, acting as an relay communications device, which received and retransmitted the ACK or the NACK message from the destination communications device. Either the source UE, the destination UE or even the assisting/relay UE may establish the communications resources for transmitting the ACK/NACK messages.

Efficient Feedback Resource Allocation by Source UE

As another example of feedback resource allocation, the source UE can decide whether ACK/NACK message relaying is enabled or not. When the channel quality is good enough, the source UE may be configured not to allocate feedback resources for relay UEs in a scheduling assignment message. That is to say that subject to a quality of communications via the D2D communications channel being sufficiently good, the source UE may indicate to the other UEs within the group that relaying from other UEs, other than the destination UE, is not required. This arrangement of disabling relay transmissions could save the resources of feedback signaling. The Source UE can determine the channel quality between destination UE and itself based on the statistics/measurements such as, for example:

the block error rate (NACKs/the number of transmission)
the mis-detection of feedback signaling (ACK/NACK) from destination UE
signal strength/measurements (synchronization signals, discovery signals)
interference level (RSSI, RSRQ)

Destination UE

According to a second example embodiment there is provided a communications device, which operates as a destination communications device. The communications device includes a transmitter configured to transmit signals to one or more other communications devices via a wireless access interface to perform device-to-device communications, a receiver configured to receive signals from the one or more other communications devices via the wireless access interface, and a controller for controlling the transmitter and the receiver to transmit or to receive the signals via the wireless access interface to receive data from a source communications device in accordance with a device-to-device communications procedure. The receiver is configured with the controller to receive from the source communications device, in accordance with the device-to-device communications procedure, an indication reserving communications resources in which the source communications device will transmit the data to the communications device, in accordance with the repeat request protocol, to receive the data from the reserved communications resources, the data being received as a plurality of data units, encoded, by the source communications device, for transmission to the communications device in accordance with the repeat request protocol, the encoding providing redundant data which can improve an integrity of correctly recovering the data when received by the destination communications device and providing an indication of whether the data has been received correctly. The controller is configured in combination with the transmitter to reserve, in accordance with the device-to-device communications procedure, communications resources for transmitting, from the communications device, an acknowledgement, ACK, message that one of the encoded data units has been correctly received by the communications device, or a negative acknowledgement, NACK, message that the encoded data units was not received correctly by the communications device, and to transmit, from the communications device, the ACK or the NACK message, in response to a transmission of an encoded data unit in accordance with the repeat request protocol by the source communications device, the ACK or the NACK message being transmitted for receipt by the source communications device or one or more other communications devices for transmission to the source communications device. The communications device, the source communications device and the one or more other communications devices form part of the same group. In this example therefore the destination UE reserves the communications resources for transmitting the ACK/NACK messages.

On-Demand Feedback Resource Allocation by Destination UE

As another example of feedback resource allocation, the destination UE can decide whether ACK/NACK message relaying is enabled or not. The destination UE may send a scheduling assignment and allocate the feedback resources for neighbor relay UE when it sends a NACK message to the source UE. This scheduling assignment message may include the NACK message also if the neighbor UE does not monitor the NACK message from the destination UE. This could minimize the resources of feedback signaling and reduce the monitoring of ACK/NACK messages.

Assisting/Relay UE

According to a third example aspect there is provided a communications device for assisting in the communication of data from a source communications device via a wireless access interface to a destination communications device in accordance with a device-to-device communication procedure. The data has been encoded, as a plurality of data units, by the source communications device for transmission to the destination communications device in accordance with a repeat request protocol, the encoding providing redundant data which can improve an integrity of correctly recovering the data when received by the destination communications device and providing an indication of whether the data has been received correctly. The communications device includes a transmitter configured to transmit signals to one or more other communications devices via a wireless access interface to perform device-to-device communications, a receiver configured to receive signals from the one or more other communications devices via the wireless access interface, and a controller for controlling the transmitter and the receiver to transmit or to receive the signals via the wireless access interface. The controller is configured to establish, with the transmitter or the receiver, communications resources for the destination communications device to transmit, to the source communications device, an acknowledgement, ACK, message that one of the encoded data units has been correctly received by the destination communications device, or a negative acknowledgement, NACK, message that the encoded data unit was not received correctly by the destination communications device. The controller is configured with the receiver to receive, an ACK message or a NACK message transmitted by the destination communications device for the source communications device, and to transmit, from the assisting communications device, the ACK or the NACK message to the source data device, the source communications device, the destination communications device and the assisting communications device belonging to the same group of communications devices. The communications resources for the re-transmission of the ACK/NACK messages may be established by the assisting/relay UE or the source UE, which may be different to the communications resources in which the ACK/NACK messages are transmitted by the destination UE. As in some examples, the assisting/relay UE may receive an indication from one of the source UE or the destination UE to disable transmission of the ACK message or the NACK message received from the destination UE, subject to a channel quality between the source UE and the destination UE being a predetermined level. In some examples the assisting/relay UE may receive a scheduling assignment message providing communications resources for transmitting the NACK message, and transmit the NACK message, the NACK message being transmitted on demand. Thus the resources for the NACK message only may be scheduled by the destination UE as and when required, effectively on demand.

Summary

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

In the foregoing description D2D communications are described with reference to an LTE system, however the presently disclosed techniques are equally applicable to other LTE system structures and other systems which are compatible with D2D communications.

The following clauses define further example aspects and features of the present technique:

1. A method of communicating data from a source communications device via a wireless access interface to a destination communications device in accordance with a device-to-device communication procedure, the method comprising encoding the data, as a plurality of data units, by the source communications device for transmission to the destination communications device in accordance with a repeat request-type protocol, the encoding providing an indication of whether the data has been received correctly, transmitting the encoded data units to the destination communications device, and receiving, by the source communications device, an acknowledgement, ACK, message that one of the encoded data units has been correctly received by the destination communications device, or a negative acknowledgement, NACK, message that the encoded data units was not received correctly by the destination communications device, the ACK or the NACK message having been transmitted by the another of the communications devices, acting as an relay communications device, which received and retransmitted the ACK or the NACK message from the destination communications device, the source communications device, the destination communications device and the other communications devices forming a group of communications devices.

2. A method according to clause 1, comprising reserving, in accordance with the device-to-device communications procedure, communications resources for receiving the ACK or the NACK messages by the source communications devices, transmitted by the other communications device and the destination communications device.

3. A method according to clause 2, wherein the reserving the communications resources for receiving the ACK or the NACK messages transmitted by the destination communications device and the other communications device, comprises transmitting, by the source communications device, a scheduling assignment message to identify the communications resources for receiving the ACK or the NACK messages by the source communications device, when transmitted by the other communications device and the destination communications device.

4. A method according to clause 2, wherein the reserving the communications resources for receiving the ACK or the NACK messages transmitted by the destination communications device and the other communications device, comprises receiving a scheduling assignment message, from the destination communications device, to identify the communications resources for receiving the ACK or the NACK messages by the source communications device, when transmitted by the other communications device and the destination communications device.

5. A method according to clause 1, wherein the reserving the communications resources for transmitting the encoded data units to the destination communications device comprises transmitting a scheduling assignment message to identify the communications resources for transmitting the encoded data units to the destination communications device in accordance with the device-to-device communications procedure.

6. A method according to any of clauses 1 to 5, comprising receiving the ACK message or the NACK message from the destination communications device in addition to the other communications device, and determining, at the source communications device, whether the data unit transmitted by the source communications device was received correctly from the ACK message or the NACK message received from at least one of the destination communications device or the other communications device acting as a relay node.

7. A method according to clause 6, wherein the determining, at the source communications device, whether the data unit was received correctly comprises receiving the ACK or the NACK message from the destination communications device, receiving the ACK or the NACK message from the other communications device acting as a relay communications device, and combining the ACK or the NACK message received from the destination communications device and the other communications device.

8. A method according to any of clauses 1 to 7, wherein the receiving the ACK message or NACK message includes receiving the ACK or NACK message with an identifier of at least one of the source communications device, the destination communications device or an identifier of the group of communications devices, whereby the other communications device can identify the source communications device to which the ACK or the NACK message should be re-transmitted.

9. A method according to any of clauses 1 to 8, comprising estimating a relative quality of communicating between the destination communications device and the source communications device, and if the estimated relative quality exceeds a predetermined level, transmitting an indication to the other communications devices in the group of communications devices to disable the re-transmission of the ACK or NACK message by the other communications device.

10. A method according to any of clauses 1 to 9, comprising reserving, by the source communications device, in accordance with the device-to-device communications procedure, communications resources for transmitting the encoded data units to the destination communications device, in accordance with the repeat request protocol, 11. A communications device, comprising a transmitter configured to transmit signals to one or more other communications devices via a wireless access interface to perform device-to-device communications, a receiver configured to receive signals from the one or more other communications devices via the wireless access interface, and a controller for controlling the transmitter and the receiver to transmit or to receive the signals via the wireless access interface to transmit or to receive data represented by the signals, and the transmitter is configured with the controller to encode the data, as a plurality of data units for transmission to a destination communications device in accordance with a repeat request-type protocol, the encoding providing an indication of whether the data has been received correctly, to transmit the encoded data units to the destination communications device, and the receiver is configured to receive, an acknowledgement, ACK, message that one of the encoded data units has been correctly received by the destination communications device, or a negative acknowledgement, NACK, message that the encoded data unit was not received correctly by the destination communications device, the ACK or the NACK message having been transmitted by another of the communications devices of the group of communications devices, acting as an relay communications device, which received and retransmitted the ACK or the NACK message from the destination communications device, the source communications device, the destination communications device and the other communications devices forming a group of communications devices.

12. A communications device according to clause 11, wherein the controller is configured to control the transmitter to reserve, in accordance with the device-to-device communications procedure, communications resources for receiving the ACK or the NACK messages, transmitted by the other communications device and the destination communications device.

13. A communications device according to clause 12, wherein the controller is configured in combination with the transmitter to reserve the communications resources for receiving the ACK or the NACK messages, transmitted by the destination communications device and the other communications device, by transmitting a scheduling assignment message to identify the communications resources for receiving the ACK or the NACK messages, when transmitted by the other communications device and the destination communications device.

14. A communications device according to clause 12, wherein the controller is configured in combination with the receiver to reserve the communications resources for receiving the ACK or the NACK messages transmitted by the destination communications device and the other communications device, by receiving a scheduling assignment message, from the destination communications device, which identifies the communications resources for receiving the ACK or the NACK messages, when transmitted by the other communications device and the destination communications device.

15. A communications device according to clause 11, wherein the controller is configured in combination with the transmitter to reserve the communications resources for transmitting the encoded data units to the destination communications device by transmitting a scheduling assignment message to identify the communications resources for transmitting the encoded data units to the destination communications device in accordance with the device-to-device communications procedure.

16. A communications device according to any of clauses 11 to 15, wherein the controller is configured in combination with the receiver to receive the ACK message or the NACK message from the destination communications device in addition to the other communications device, and to determine whether the encoded data unit was received correctly from the ACK message or the NACK message received from at least one of the destination communications device or the other communications device acting as a relay.

17. A communications device according to clause 16, wherein the controller is configured in combination with the receiver to determine whether the data unit was received correctly by receiving the ACK or the NACK message from the destination communications device, receiving the ACK or the NACK message from the other communications device acting as a relay communications device, and combining the ACK or the NACK message received from the destination communications device and the other communications device.

18. A communications device according to any of clauses 11 to 17, wherein the controller is configured in combination with the receiver to receive the ACK message or the NACK message with an identifier of at least one of the source communications device, the destination communications device or the group of communications devices, whereby the other communications device can identify the communications device to which the ACK or the NACK message should be re-transmitted.

19. A communications device according to any of clauses 11 to 18, wherein the controller is configured in combination with the transmitter and the receiver to estimate a relative quality of communicating between the destination communications device and the source communications device, and if the estimated relative quality exceeds a predetermined level, to transmit an indication to the other communications devices in the group of communications devices to disable the re-transmission of the ACK or NACK message by the other communications device.

20. A communications device according to any of clauses 11 to 19, wherein the controller is configured in combination with the transmitter and the receiver to reserve, in accordance with a device-to-device communications procedure, communications resources for transmitting the encoded data units to the destination communications device, in accordance with the repeat request protocol.

21. A method of receiving data at a communications device from a source communications device via a wireless access interface in accordance with a device-to-device communication procedure, the method comprising receiving the data, the data being received as a plurality of data units, encoded, by the source communications device, for transmission to the communications device in accordance with the repeat request-type protocol, the encoding providing an indication of whether the data has been received correctly, reserving, in accordance with the device-to-device communications procedure, communications resources for transmitting, from the communications device, an acknowledgement, ACK, message that one of the encoded data units has been correctly received by the communications device, or a negative acknowledgement, NACK, message that the encoded data units was not received correctly by the communications device, and transmitting, from the communications device, the ACK or the NACK message, in response to a transmission of an encoded data unit in accordance with the repeat request protocol by the source communications device, the ACK or the NACK message being transmitted for receipt by the source communications device or one or more other communications devices for transmission to the source communications device, the communications device, the source communications device and the one or more other communications devices forming part of the same group of communications devices.

22. A method according to clause 21, wherein the reserving the communications resources for transmitting the ACK or the NACK messages for reception by the source communications device and the one or more other communications devices of the group, comprises transmitting a scheduling assignment message to reserve the communications resources for transmitting the ACK or the NACK messages, for reception by the source communications device and the one or more other communications devices.

23. A method according to clause 22, wherein the transmitting a scheduling assignment message to reserve the communications resources for transmitting the ACK or the NACK messages, comprises transmitting the scheduling assignment message to reserve the communications resources if the NACK message is to be transmitted.

24. A method according to clause 21, 22 or 23, wherein the receiving the ACK message or NACK message includes receiving the ACK or NACK message with an identifier of at least one of the source communications device, the destination communications device or an identifier of the group of communications devices, whereby the other communications device can identify the source communications device to which the ACK or the NACK message should be re-transmitted.

25. A method according to any of clauses 21 to 24, comprising receiving from the source communications device, in accordance with the device-to-device communications procedure, an indication reserving communications resources in which the source communications device will transmit the data to the communications device, in accordance with the repeat request protocol.

26. A communications device, comprising a transmitter configured to transmit signals to one or more other communications devices via a wireless access interface to perform device-to-device communications, a receiver configured to receive signals from the one or more other communications devices via the wireless access interface, and a controller for controlling the transmitter and the receiver to transmit or to receive the signals via the wireless access interface to receive data from a source communications device in accordance with a device-to-device communications procedure, and the receiver is configured with the controller to receive the data, the data being received as a plurality of data units, encoded, by the source communications device, for transmission to the communications device in accordance with the repeat request protocol, the encoding providing redundant data which can improve an integrity of correctly recovering the data when received by the destination communications device and providing an indication of whether the data has been received correctly, and the controller is configured in combination with the transmitter to reserve, in accordance with the device-to-device communications procedure, communications resources for transmitting, from the communications device, an acknowledgement, ACK, message that one of the encoded data units has been correctly received by the communications device, or a negative acknowledgement, NACK, message that the encoded data units was not received correctly by the communications device, and to transmit, from the communications device, the ACK or the NACK message, in response to a transmission of an encoded data unit in accordance with the repeat request protocol by the source communications device, the ACK or the NACK message being transmitted for receipt by the source communications device or one or more other communications devices for transmission to the source communications device, wherein the communications device, the source communications device and the one or more other communications devices forming part of the same group.

27. A communications device according to clause 26, wherein the controller is configured in combination with the transmitter to reserve the communications resources for transmitting the ACK or the NACK messages for reception by the source communications device and the one or more other communications devices of the group, by transmitting a scheduling assignment message to reserve the communications resources for transmitting the ACK or the NACK messages, for reception by the source communications device and the one or more other communications devices.

28. A communications device as claims in Claim 27, wherein the controller is configured in combination with the transmitter to transmit the scheduling assignment message to reserve the communications resources if the controller determines that a NACK message is to be transmitted.

29. A communications device according to any of clauses 26, 27 or 28, wherein the controller is configured in combination with the receiver to receive the ACK message or NACK message includes receiving the ACK or NACK message with an identifier of at least one of the source communications device, the communications device or an identifier of the group of communications devices, whereby the other communications device can identify the source communications device to which the ACK or the NACK message should be re-transmitted.

30. A communications device according to any of clauses 26 to 29, wherein the controller is configured in combination with the receiver to receive from the source communications device, in accordance with the device-to-device communications procedure, an indication reserving communications resources in which the source communications device will transmit the data to the communications device, in accordance with the repeat request protocol.

31. A method of assisting in the communication of data from a source communications device via a wireless access interface to a destination communications device in accordance with a device-to-device communication procedure, the data being encoded, as a plurality of data units, by the source communications device for transmission to the destination communications device in accordance with a repeat request-type protocol, the encoding providing an indication of whether the data has been received correctly by the destination communications device, the method comprising establishing communications resources for the destination communications device to transmit, to the source communications device, an acknowledgement, ACK, message that one of the encoded data units has been correctly received by the destination communications device, or a negative acknowledgement, NACK, message that the encoded data unit was not received correctly by the destination communications device, receiving, by the assisting communications device, an ACK message or a NACK message transmitted by the destination communications device for the source communications device, and transmitting, from the assisting communications device, the ACK or the NACK message to the source data device, the source communications device, the destination communications device and the assisting communications device belonging to the same group of communications devices.

32. A method according to clause 31, wherein the establishing the communications resources for the destination communications device to transmit, to the source communications device, the ACK message or the NACK message comprises receiving an indication reserving communications resources for the communications device to transmit, to the source communications device, the ACK message or the NACK message, which has been received from the destination communications device.

33. A method according to clause 32, wherein the receiving the indication reserving communications resources for the communications device to transmit the ACK message or the NACK message, comprises receiving the indication reserving the communications resources to transmit the ACK or the NACK message from the source communications device.

34. A method according to clause 31, 32 or 33, wherein the establishing the communications resources for transmitting the ACK or the NACK messages received from the destination communications device, comprises transmitting a scheduling assignment message to reserve the communications resources for transmitting the ACK or the NACK messages by the communications device, when received from the destination communications device.

35. A method according to clause 31, 32, 33 or 34, wherein the communications resources for the communications device to transmit the ACK message or the NACK message are different from the communications resources which are reserved for destination communications device to transmit the ACK message or the NACK message to the source communications device.

36. A method according to any of clauses 31 to 35, wherein the receiving the ACK message or NACK message includes receiving the ACK or NACK message with an identifier of at least one of the source communications device, the destination communications device or an identifier of the group of communications devices, and the method comprising determining from the identifier received with the ACK message or the NACK message the destination communications device to which the ACK message or the NACK message should be re-transmitted, by identifying the source communications device, the destination communications device or the group of communications devices.

37. A method according to any of clauses 31 to 36, comprising
receiving an indication from one of the source communications device or the destination communications device to disable transmission of the ACK message or the NACK message received from the destination communications device, subject to a channel quality between the source communications device and the destination communications device being a predetermined level.

38. A method according to any of clauses 31 to 37, wherein the transmitting the NACK message comprises
receiving a scheduling assignment message providing communications resources for transmitting the NACK message, and
transmitting the NACK message, the NACK message being transmitted on demand.

39. A communications device for assisting in the communication of data from a source communications device via a wireless access interface to a destination communications device in accordance with a device-to-device communication procedure, the data being encoded, as a plurality of data units, by the source communications device for transmission to the destination communications device in accordance with a repeat request-type protocol, the encoding providing an indication of whether the data has been received correctly by the destination communications device, the communications device comprising
a transmitter configured to transmit signals to one or more other communications devices via a wireless access interface to perform device-to-device communications,
a receiver configured to receive signals from the one or more other communications devices via the wireless access interface, and
a controller for controlling the transmitter and the receiver to transmit or to receive the signals via the wireless access interface
to establish communications resources for the destination communications device to transmit, to the source communications device, an acknowledgement, ACK, message that one of the encoded data units has been correctly received by the destination communications device, or a negative acknowledgement, NACK, message that the encoded data unit was not received correctly by the destination communications device,
to receive, by the assisting communications device, an ACK message or a NACK message transmitted by the destination communications device for the source communications device, and
to transmit, from the assisting communications device, the ACK or the NACK message to the source data device, the source communications device, the destination communications device and the assisting communications device belonging to the same group of communications devices.

40. A communications device according to clause 39, wherein the controller is configure in combination with the receiver to establish the communications resources for the destination communications device to transmit, to the source communications device, the ACK message or the NACK message by
receiving an indication reserving communications resources for the communications device to transmit, to the source communications device, the ACK message or the NACK message, which has been received from the destination communications device.

41. A communications device according to clause 40, wherein the receiving the indication reserving communications resources for the communications device to transmit the ACK message or the NACK message, comprises receiving the indication reserving the communications resources to transmit the ACK or the NACK message from the source communications device.

42. A communications device according to clause 39, 40 or 41, wherein the controller is configure in combination with the transmitter to establish the communications resources for transmitting the ACK or the NACK messages received from the destination communications device, by
transmitting a scheduling assignment message to reserve the communications resources for transmitting the ACK or the NACK messages by the communications device, when received from the destination communications device.

43. A communications device according to any of clauses 39 to 42, wherein the communications resources for the communications device to transmit the ACK message or the NACK message are different from the communications resources which are reserved for destination communications device to transmit the ACK message or the NACK message to the source communications device.

44. A communications device according to any of clauses 39 to 43, wherein the controller is configure in combination with the receiver,
to receive the ACK or NACK message with an identifier of at least one of the source communications device, the destination communications device or an identifier of the group of communications devices, and
to determine from the identifier received with the ACK message or the NACK message the destination communications device to which the ACK message or the NACK message should be re-transmitted, by identifying the source communications device, the destination communications device or the group of communications devices.

45. A communications device according to any of clauses 39 to 44, wherein the controller is configured in combination with the receiver
to receive an indication from one of the source communications device or the destination communications device to disable transmission of the ACK message or the NACK message received from the destination communications device, subject to a channel quality between the source communications device and the destination communications device being a predetermined level.

46. A communications device according to any of clauses 39 to 45, wherein the controller is configured in combination with the transmitter and the receiver
to receive a scheduling assignment message providing communications resources for transmitting the NACK message, and
to transmit the NACK message, the NACK message being transmitted on demand.

REFERENCES

[1] R2-133840, "CSMA/CA based resource selection," Samsung, published at 3GPP TSG-RAN WG2 #84, San Francisco, USA, 11-15 Nov. 2013.

[2] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.

[3] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.

[4] R2-134426, "Medium Access for D2D communication", LG Electronics Inc, published at 3GPP TSG-RAN WG2 #84, San Francisco, USA, 11-15 Nov. 2013.

[5] R2-134238, "D2D Scheduling Procedure", Ericsson, published at 3GPP TSG-RAN WG2 #84, San Francisco, USA, 11-15 Nov. 2013.

[6] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.

[7] R2-134431, "Simulation results for D2D voice services using connectionless approach", General Dynamics Broadband UK, published at 3GPP TSG-RAN WG2 #84, San Francisco, USA, 11-15 Nov. 2013.

[8] "D2D Resource Allocation under the Control of BS", Xiaogang R. et al, University of Electronic Science and Technology of China, https://mentor.ieee.org/802.16/dcn/13/16-13-0123-02-000n-d2d-resource-allocation-under-the-control-of-bs.docx

[9] US20130170387

[10] US20120300662

[11] LTE for UMTS: OFDMA and SC-FDMA Based Radio Access, Harris Holma and Antti Toskala, Wiley 2009, ISBN 978-0-470-99401-6.

[12] "D2D Communication in LTE", InterDigital, Tdoc number R1-132188_3GPP TSG-RAN WG1 Meeting #73 Fukuoka, Japan, 20-24 May 2013 (http://www.3gpp.org/ftp/tsg_ran/WG1_RL1/TSGR1_73/Docs/)

The invention claimed is:

1. A method of communicating data from a source communications device via a wireless access interface to a destination communications device in accordance with a device-to-device (D2D) communication procedure, the method comprising
encoding the data, as a plurality of data units, by the source communications device for transmission to the destination communications device in accordance with a repeat request-type protocol;
transmitting the encoded data units to the destination communications device;
receiving, by the source communications device, an acknowledgement (ACK) message that one of the encoded data units has been correctly received by the destination communications device, or a negative acknowledgement (NACK) message that the encoded data units was not received correctly by the destination communications device, the ACK or the NACK message having been transmitted by the another of the communications devices, acting as an relay communications device, which received and retransmitted the ACK or the NACK message from the destination communications device;
receiving, by the source communications device from the destination communications device, a scheduling assignment message identifying communications resources for receiving the ACK or the NACK messages when transmitted by the other communications device and the destination communications device; and
reserving, in accordance with the D2D communications procedure, the communications resources identified in the scheduling assignment message for receiving the ACK or the NACK messages when transmitted by the other communications device and the destination communications device.

2. The method of claim 1, further comprising:
transmitting a scheduling assignment message to identify communications resources for transmitting the encoded data units to the destination communications device in accordance with the D2D communications procedure.

3. The method of claim 1, comprising:
receiving the ACK message or the NACK message from the destination communications device and the other communications device; and
determining, at the source communications device, whether the data unit transmitted by the source communications device was received correctly from the ACK message or the NACK message received from at least one of the destination communications device or the other communications device acting as a relay node.

4. The method of claim 3, wherein the determining, at the source communications device, whether the data unit was received correctly comprises:
receiving the ACK or the NACK message from the destination communications device;
receiving the ACK or the NACK message from the other communications device acting as a relay communications device; and
combining the ACK or the NACK message received from the destination communications device and the other communications device.

5. The method of claim 1, wherein the receiving the ACK message or NACK message includes receiving the ACK or NACK message with an identifier of at least one of the source communications device, the destination communications device or an identifier of the group of communications devices.

6. The method of claim 1, comprising:
estimating a relative quality of communicating between the destination communications device and the source communications device; and
if the estimated relative quality exceeds a predetermined level, transmitting an indication to the other communications devices in the group of communications devices to disable the re-transmission of the ACK or NACK message by the other communications device.

7. The method of claim 1, comprising:
reserving, by the source communications device, in accordance with the D2D communications procedure, communications resources for transmitting the encoded data units to the destination communications device, in accordance with the repeat request protocol.

8. A communications device, comprising
a transmitter configured to transmit signals to one or more other communications devices via a wireless access interface to perform device-to-device (D2D) communications;
a receiver configured to receive signals from the one or more other communications devices via the wireless access interface; and
a controller for controlling the transmitter and the receiver to transmit or to receive the signals via the wireless access interface to transmit or to receive data represented by the signals, and
the transmitter is configured with the controller to
encode the data, as a plurality of data units for transmission to a destination communications device in accordance with a repeat request-type protocol; and
transmit the encoded data units to the destination communications device, the receiver is configured to
receive, an acknowledgement (ACK) message that one of the encoded data units has been correctly received by the destination communications device, or a negative acknowledgement (NACK) message that the encoded data unit was not received correctly by the destination communications device, the ACK or the NACK message having been transmitted by another of the communications devices of the group of communications devices, acting as an relay communications device, which received and retransmitted the ACK or the NACK message from the destination communications device; and
receive, from the destination communications device, a scheduling, assignment message identifying communications resources for receiving the ACK or the NACK messages when transmitted by the other communications device and the destination communications device, and
the controller is configured to reserve, in accordance with the D2D communications procedure, the communications resources identified in the scheduling assignment message for receiving the ACK or the NACK messages when transmitted by the other communications device and the destination communications device.

9. The communications device of claim 8, wherein the controller is configured in combination with the transmitter to reserve communications resources for transmitting the encoded data units to the destination communications device by transmitting a scheduling assignment message to identify the communications resources for transmitting the encoded data units to the destination communications device in accordance with the (D2D) communications procedure.

10. The communications device of claim 8, wherein the controller is configured in combination with the receiver to:
receive the ACK message or the NACK message from the destination communications device in addition to the other communications device; and
determine whether the encoded data unit was received correctly from the ACK message or the NACK message received from at least one of the destination communications device or the other communications device acting as a relay.

11. The communications device of claim 10, wherein the controller is configured in combination with the receiver to determine whether the data unit was received correctly by:
receiving the ACK or the NACK message from the destination communications device;
receiving the ACK or the NACK message from the other communications device acting as a relay communications device; and
combining the ACK or the NACK message received from the destination communications device and the other communications device.

12. The communications device of claim 8, wherein the controller is configured in combination with the receiver to receive the ACK message or the NACK message with an identifier of at least one of the source communications device, the destination communications device or the group of communications devices.

13. The communications device of claim 8, wherein the controller is configured in combination with the transmitter and the receiver to:
estimate a relative quality of communicating between the destination communications device and the source communications device; and
if the estimated relative quality exceeds a predetermined level, to transmit an indication to the other communications devices in the group of communications devices to disable the re-transmission of the ACK or NACK message by the other communications device.

14. The communications device of claim 8, wherein the controller is configured in combination with the transmitter and the receiver to reserve, in accordance with the D2D communications procedure, communications resources for transmitting the encoded data units to the destination communications device, in accordance with the repeat request protocol.

15. A method of receiving data at a communications device from a source communications device via a wireless access interface in accordance with a device-to-device (D2D) communication procedure, the method comprising:
receiving the data, the data being received as a plurality of data units, encoded, by the source communications device, for transmission to the communications device in accordance with the repeat request-type protocol;
reserving, in accordance with the D2D communications procedure, communications resources for transmitting, from the communications device, an acknowledgement (ACK) message that one of the encoded data units has been correctly received by the communications device, or a negative acknowledgement (NACK) message that the encoded data units was not received correctly by the communications device;
transmitting, to the source communications device, a scheduling assignment message identifying the communications resources for transmitting the ACK or the NACK messages when transmitted by the communications device; and
transmitting, from the communications device, the ACK or the NACK message, in response to a transmission of an encoded data unit in accordance with the repeat request protocol by the source communications device, the ACK or the NACK message being transmitted for receipt by the source communications device or one or more other communications devices for transmission to the source communications device.

16. An electronic device comprising:
circuitry configured to
encode data, as a plurality of data units, for transmission to a destination communications device in accordance with a repeat request-type protocol;
transmit the encoded data units to the destination communications device;
receive an acknowledgement (ACK) message that one of the encoded data units has been correctly received by the destination communications device, or a negative acknowledgement (NACK) message that the encoded data units was not received correctly by the destination communications device, the ACK or the NACK message having been transmitted by another communication device, acting as an relay node, which received and retransmitted the ACK or the NACK message from the destination communications device;
receive, from the destination communications device, a scheduling assignment message identifying communications resources for receiving the ACK or the NACK messages when transmitted by the relay node and the destination communications device; and
reserving the communications resources identified in the scheduling assignment message for receiving the ACK or the NACK messages when transmitted by the relay node and the destination communications device.

* * * * *